(12) United States Patent
Itoga et al.

(10) Patent No.: US 7,725,244 B2
(45) Date of Patent: May 25, 2010

(54) CONTROL APPARATUS AND METHOD FOR INTERNAL COMBUSTION ENGINE

(75) Inventors: Chiho Itoga, Saitama-ken (JP); Ken Ogawa, Saitama-ken (JP); Toru Kitamura, Saitama-ken (JP); Toshinari Shinohara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 12/005,738

(22) Filed: Dec. 28, 2007

(65) Prior Publication Data

US 2008/0162021 A1   Jul. 3, 2008

(30) Foreign Application Priority Data

Dec. 28, 2006   (JP) .............................. 2006-355542

(51) Int. Cl.
*G05D 1/00* (2006.01)
(52) U.S. Cl. .................................................... 701/108
(58) Field of Classification Search ... 123/90.12–90.14, 123/295, 305; 137/198, 40; 74/44, 568 R; 29/888.06; 464/1, 2, 160; 701/108; *G05D 1/00*
See application file for complete search history.

(56) References Cited

U.S. PATENT DOCUMENTS

| | | | | |
|---|---|---|---|---|
| 6,058,906 | A * | 5/2000 | Yoshino | 123/295 |
| 7,063,055 | B2 * | 6/2006 | Bloms et al. | 123/90.12 |
| 7,478,614 | B2 * | 1/2009 | Nakamura et al. | 123/90.15 |
| 2001/0052335 | A1 * | 12/2001 | Miyakubo et al. | 123/305 |

FOREIGN PATENT DOCUMENTS

| | | |
|---|---|---|
| JP | 11-218036 | 8/1999 |
| JP | 2000-356143 | 12/2000 |
| JP | 2002-155780 | 5/2002 |
| JP | 2003-083149 | 3/2003 |
| JP | 2003-148199 | 5/2003 |
| JP | 2004-92523 | 3/2004 |
| JP | 2005-16407 | 1/2005 |

OTHER PUBLICATIONS

Japanese Office Action for Application No. 2006-355542, dated Apr. 28, 2009.

* cited by examiner

*Primary Examiner*—Stephen K Cronin
*Assistant Examiner*—Keith Coleman
(74) *Attorney, Agent, or Firm*—Lahive & Cockfield, LLP; Anthony A. Laurentano, Esq.

(57) ABSTRACT

A control apparatus and method for an internal combustion engine are provided for ensuring a stable combustion state and improving the fuel efficiency when an air-fuel mixture is burnt with self ignition while auxiliarily using a spark ignition. The control apparatus for an internal combustion engine which is operated in a plurality of modes including a torch self ignition combustion mode comprises an ECU. In the torch self ignition combustion mode, the ECU controls an internal EGR amount, calculates an actual exhaust closing angle, calculates a target exhaust closing angle, calculates a closing angle deviation, calculates a fuel injection amount for forming a homogeneous air-fuel mixture, calculates a correction coefficient in accordance with the closing angle deviation, and corrects a basic value by the correction coefficient to calculate a fuel injection amount for forming a stratified air-fuel mixture.

10 Claims, 13 Drawing Sheets

CONTROL APPARATUS AND METHOD FOR INTERNAL COMBUSTION ENGINE

BACKGROUND OF THE INVENTION

1. Field of the Invention

The present invention relates to a control apparatus and method for an internal combustion engine for burning an air-fuel mixture with self ignition while auxiliarily using a spark ignition.

2. Description of the Prior Art

Conventionally, as this type of control apparatus for an internal combustion engine, one described, for example, in Laid-open Japanese Patent Application No. 2005-16407 is known. This internal combustion engine is of a type which can be operated by switching between a self ignition combustion mode for burning an air-fuel mixture with compression self ignition while auxiliarily using a spark ignition and a normal combustion mode for burning an air-fuel mixture with flame propagation using a spark ignition. This internal combustion engine comprises an exhaust gas recirculation mechanism, a valve timing varying mechanism, and a valve operation characteristic switching mechanism. This exhaust gas recirculating mechanism recirculates exhaust gases in an exhaust passage to an intake passage as a relatively low-temperature recirculated gas, and comprises an EGR passage, an EGR control valve for controlling a recirculated gas amount, an EGR cooler for cooling down the recirculated gas, and the like.

Also, in the internal combustion engine, a valve timing of an exhaust gas valve is retarded or advanced in response to a change in the phase of an exhaust gas cam shaft with respect to a crank shaft by the valve timing varying mechanism, and operation characteristics of the exhaust gas valve is switched between operation characteristics for the self ignition combustion mode and operation characteristics for the normal mode by the valve operation characteristic switching mechanism. In this way, as the operation characteristics of the exhaust gas valve is switched to the operation characteristics for the self ignition combustion mode, the exhaust gas valve is once opened and closed in an exhaust stroke, and subsequently is again opened and closed in an intake stroke. In this way, exhaust gases discharged to the exhaust passage flow back into a combustion chamber, and remains within the combustion chamber as previously burnt gases until the next combustion cycle. The previously burnt gases remaining in this manner are at higher temperatures than recirculated gases by the exhaust gas recirculating mechanism.

On the other hand, the control apparatus comprises a water temperature sensor for detecting an engine water temperature which is the temperature of cooling water of the internal combustion engine, a throttle valve opening sensor for detecting the opening of a throttle valve, an engine rotational speed sensor for detecting the engine rotational speed, and the like. This control apparatus determines whether or not the internal combustion engine is in a warm operation based on the engine water temperature, and determines operation ranges of the internal combustion engine (i.e., a load range and a rotation range) based on the opening of the throttle valve and the engine rotational speed when the internal combustion engine is in the warm operation. Then, when the operation range of the internal combustion engine is in a hot EGR range (low load and low rotational speed range) or a cold EGR range (middle load and middle rotational speed), the self ignition combustion mode is executed as a combustion mode of the internal combustion engine, and the normal combustion mode is executed when the operation range is in another range.

In this self ignition combustion mode, when the operation range of the internal combustion engine is in the hot EGR range, the valve timing varying mechanism and the valve operation characteristic switching mechanism are driven to control the amount of remaining previously burnt gases, thereby controlling the temperature of gases within a cylinder. On the other hand, when the operation range of the internal combustion engine is in the cold EGR range, the exhaust gas recirculation mechanism is driven to control the amount of recirculated gases, thereby controlling the temperature of gases within the cylinder.

According to the conventional control apparatus for an internal combustion engine described above, when the operation range of the internal combustion engine is in the hot EGR range, the valve timing varying mechanism and the valve operation characteristic switching mechanism are driven to control the amount of remaining previously burnt gases i.e., the temperature of gases within the cylinder, but the valve timing varying mechanism and the valve operation characteristic switching mechanism have response relays and lag times due to their structural characteristics, and therefore fail to appropriately control the temperature of gases within the cylinder, possibly resulting in an unstable combustion state and a lower fuel efficiency. Further, when the operation range of the internal combustion engine is in the cold EGR range, the temperature of gases in the cylinder is controlled by way of the exhaust gas recirculation mechanism, but the exhaust gas recirculation mechanism has a relatively large response delay and lag time due to its structural characteristics, and therefore suffers from a large degree to which the combustion state becomes unstable and a large degree to which the fuel efficiency is exacerbated due to a relatively large degree of reducing the control accuracy of the temperature of gases within the cylinder, and in the worst case, can experience flame off, although an auxiliary spark ignition is performed.

SUMMARY OF THE INVENTION

The present invention has been made to solve the problems as mentioned above, and it is an object of the invention to provide a control apparatus and method for an internal combustion engine which are capable of ensuring a stable combustion state and improving the fuel efficiency when an air-fuel mixture is burnt with self ignition while auxiliarily using a spark ignition.

To achieve the above object, according to a first aspect of the present invention, there is provided a control apparatus for an internal combustion engine which is operated in a plurality of combustion modes including a torch self ignition combustion mode which involves changing a remaining amount of previously burnt gas generated within a cylinder as an internal EGR amount by an internal EGR device, forming an air-fuel mixture including both a stratified air-fuel mixture and a homogeneous air-fuel mixture by a fuel injection by a fuel injection device, burning the stratified air-fuel mixture with a spark ignition, and burning the homogeneous air-fuel mixture with self ignition using the burning stratified air-fuel mixture as a torch. The control apparatus is characterized by comprising internal EGR control means for controlling the internal EGR amount by driving the internal EGR device; actual internal EGR amount parameter calculating means for calculating an actual internal EGR amount parameter indicative of an actual internal EGR amount which is an estimate of the internal EGR amount; target internal EGR amount parameter calculating means for calculating a target internal EGR amount parameter which is a target for the actual internal EGR amount parameter; index value calculating means for calculating one of a relative deviation and ratio between the calculated target internal EGR amount parameter and the calculated actual internal EGR amount parameter, as an index value; fuel injection amount calculating means for calculating fuel injection amounts for producing a homogeneous air-fuel mixture and for producing a stratified air-fuel mixture, respectively, and calculating the fuel injection amount for producing a stratified air-fuel mixture in accordance with the calculated index value when in the torch self ignition combustion mode; and fuel injection control means for injecting a fuel of the calculated fuel injection amount for producing a homogeneous air-fuel mixture at a timing for producing a homogeneous air-fuel mixture, and injecting the fuel of the calculated fuel injection amount for producing a stratified air-fuel mixture at a timing for producing a stratified air-fuel mixture by driving the fuel injection device.

According to this control apparatus for an internal combustion engine, the internal EGR amount is controlled by driving the internal EGR device, the fuel injection amounts for producing a homogeneous air-fuel mixture and for producing a stratified air-fuel mixture are calculated, respectively, and the fuel injection amount for producing a stratified air-fuel mixture is calculated in accordance with the calculated index value in the torch self ignition combustion mode. Then, by driving the fuel injection device, the fuel of the fuel injection amount for producing a homogeneous air-fuel mixture is injected at the timing for producing a homogeneous air-fuel mixture, and the fuel of the fuel injection amount for producing a stratified air-fuel mixture is injected at the timing for producing a stratified air fuel mixture. In this event, the index value is calculated as a value indicative of one of the relative deviation and ratio between the target internal EGR amount parameter and the actual internal EGR amount parameter, i.e., a value indicative of a relative representation in magnitude between the two, so that when in the torch self injection combustion mode, the fuel injection amount for producing a stratified air-fuel mixture can be produced while reflecting a lacking degree or an exceeding degree of the actual internal EGR amount with respect to the target internal EGR amount. In this way, even if the in-cylinder gas temperature falls out of a temperature range optimal for the combustion due to a lack or an excess of the internal EGR amount in the torch self ignition combustion mode, the fuel injection amount for producing a stratified air-fuel mixture is increased or decreased to increase or decrease the thermal energy during the combustion of the stratified air-fuel mixture which serves as a torch in the combustion cycle, thereby making it possible to rapidly ensure the in-cylinder gas temperature optimal for the self ignition combustion of the homogeneous air-fuel mixture, as compared with the conventional approach which controls the internal EGR amount or a recirculated gas amount. As a result, a stable combustion condition can be ensured, and the fuel efficiency can be improved.

To achieve the above object, according to a second aspect of the present invention, there is provided a control method for an internal combustion engine which is operated in a plurality of combustion modes including a torch self ignition combustion mode which involves changing a remaining amount of previously burnt gas generated within a cylinder as an internal EGR amount by an internal EGR device, forming an air-fuel mixture including both a stratified air-fuel mixture and a homogeneous air-fuel mixture by a fuel injection by a fuel injection device, burning the stratified air-fuel mixture with a spark ignition, and burning the homogeneous air-fuel mixture with self ignition using the burning stratified air-fuel mixture as a torch. The control method is characterized by comprising the steps of controlling the internal EGR amount by driving the internal EGR device; calculating an actual internal EGR amount parameter indicative of an actual internal EGR amount which is an estimate of the internal EGR amount; calculating a target internal EGR amount parameter which is a target for the actual internal EGR amount parameter; calculating one of a relative deviation and ratio between the calculated target internal EGR amount parameter and the calculated actual internal EGR amount parameter, as an index value; calculating fuel injection amounts for producing a homogeneous air-fuel mixture and for producing a stratified air-fuel mixture, respectively, and calculating the fuel injection amount for producing a stratified air-fuel mixture in accordance with the calculated index value when in the torch self ignition combustion mode; and injecting a fuel of the calculated fuel injection amount for producing a homogeneous air-fuel mixture at a timing for producing a homogeneous air-fuel mixture, and injecting the fuel of the calculated fuel injection amount for producing a stratified air-fuel mixture at a timing for producing a stratified air-fuel mixture by driving the fuel injection device.

This method provides the same advantageous effects as described above concerning the abnormality determining apparatus according to the first aspect of the invention.

Preferably, in the control apparatus for an internal combustion engine described above, the fuel injection amount calculating means includes correcting means for correcting, when the index value indicates that the target internal EGR amount parameter exceeds the actual internal EGR amount parameter in the torch self ignition combustion mode, the fuel injection amount for producing a stratified air-fuel mixture to be larger as the exceeding degree is larger.

According to this preferred embodiment of the control apparatus for an internal combustion engine, in the torch self ignition combustion mode, when the index value indicates that the target internal EGR amount parameter exceeds the actual internal EGR amount parameter, the fuel injection amount for producing a stratified air-fuel mixture is corrected to be larger as the exceeding degree is larger. Accordingly, even if the in-cylinder gas temperature is lower than the optimal temperature for the combustion, which is particularly problematic when a homogeneous air-fuel mixture is burnt with self ignition, in the torch self ignition combustion mode, the fuel injection amount for producing a stratified air-fuel mixture is increased to increase the thermal energy when the stratified air-fuel mixture is burnt, thereby making it possible to rapidly and reliably achieve the optimal in-cylinder gas temperature for the self ignition combustion of the homogeneous air-fuel mixture in the combustion cycle. As a result, a stable combustion state can be ensured, and the fuel efficiency can be improved.

Preferably, in the control method for an internal combustion engine described above, the fuel injection amount calculating step includes the step of correcting, when the index value indicates that the target internal EGR amount parameter exceeds the actual internal EGR amount parameter in the torch self ignition combustion mode, the fuel injection amount for producing a stratified air-fuel mixture to be larger as the exceeding degree is larger.

This preferred embodiment of the control method provides the same advantageous effects as described above concerning the control apparatus according to the first aspect of the invention.

Preferably, the control apparatus for an internal combustion engine described above further comprises failure determining means for determining that the internal EGR device has failed when the index value indicates that the target internal EGR amount parameter exceeds the actual internal EGR amount parameter to a predetermined degree or more, wherein the fuel injection amount calculating means sets the fuel injection amount for producing a stratified air-fuel mixture to the value of zero when the failure determining means determines that the internal EGR device has failed.

According to this preferred embodiment of the control apparatus for an internal combustion engine, when it is determined that the internal EGR device has failed, the fuel injection amount for producing a stratified air-fuel mixture is set to the value of zero, so that the fuel injection amount for producing a homogeneous air-fuel mixture alone is injected at the timing for producing a homogeneous air-fuel mixture even in the torch self ignition combustion mode. In this way, even in the torch self ignition combustion mode, when the internal EGR device fails, the internal combustion engine is operated to burn the homogeneous air-fuel mixture with a spark ignition, so that, for example, by setting not to use the internal EGR device, it is possible to restrain an unstable combustion state and a lower fuel efficiency resulting from a lack of the internal EGR amount and therefore ensure good drivability.

Preferably, the control method for an internal combustion engine described above further comprises the step of determining that the internal EGR device has failed when the index value indicates that the target internal EGR amount parameter exceeds the actual internal EGR amount parameter to a predetermined degree or more, wherein the fuel injection amount calculating step includes setting the fuel injection amount for producing a stratified air-fuel mixture to the value of zero when the failure determining step determines that the internal EGR device has failed.

This preferred embodiment of the control method provides the same advantageous effects as described above concerning the control apparatus according to the first aspect of the invention.

Preferably, in the control apparatus for an internal combustion engine described above, aid failure determining means determines that the internal EGR device has failed when the index value remains indicating, for a predetermined time or more, that the target internal EGR amount parameter exceeds the actual internal EGR amount parameter to a predetermined degree or more.

According to this preferred embodiment of the control apparatus for an internal combustion engine, it is determined that the internal EGR device has failed when the index value remains indicating, for a predetermined time or more, that the target internal EGR amount parameter exceeds the actual internal EGR amount parameter to a predetermined degree or more, so that even if the index value temporarily indicates that the target internal EGR amount parameter exceeds the actual internal EGR amount parameter to a predetermined degree or more, due to noise or a detection error in spite of the fact that the internal EGR device is normal, it is possible to avoid erroneously determining that the internal EGR device has failed, making it possible to improve the accuracy of the failure determination.

Preferably, in the control method for an internal combustion engine described above, the failure determining step includes determining that the internal EGR device has failed when the index value remains indicating, for a predetermined time or more, that the target internal EGR amount parameter exceeds the actual internal EGR amount parameter to a predetermined degree or more.

This preferred embodiment of the control method provides the same advantageous effects as described above concerning the control apparatus according to the first aspect of the invention.

Preferably, the control apparatus for an internal combustion engine described above further comprises operating condition parameter detecting means for detecting an operating condition parameter indicative of an actual operating condition of the internal EGR device, wherein the actual internal EGR amount parameter calculating means calculates the actual internal EGR amount parameter in accordance with the detected operating condition parameter.

According to this preferred embodiment of the control apparatus for an internal combustion engine, the actual internal EGR amount parameter is calculated in accordance with the operating condition parameter indicative of the actual operating condition of the internal EGR device. In this event, since the operating condition parameter detecting means can be utilized in the control of the internal EGR amount, the fuel injection control and the internal EGR control can be executed while sharing such operating condition parameter detecting means, in which case the cost can be reduced.

Preferably, the control method for an internal combustion engine described above, further comprises the step of detecting an operating condition parameter indicative of an actual operating condition of the internal EGR device, wherein the actual internal EGR amount parameter calculating step includes calculating the actual internal EGR amount parameter in accordance with the detected operating condition parameter.

This preferred embodiment of the control method provides the same advantageous effects as described above concerning the control apparatus according to the first aspect of the invention.

Preferably, in the control apparatus for an internal combustion engine described above, the actual internal EGR amount parameter calculating means calculates the actual internal EGR amount parameter as an actual in-cylinder gas temperature which is an estimate of an unburnt gas temperature within the cylinder.

According to this preferred embodiment of the control apparatus for an internal combustion engine, the actual internal EGR amount parameter is calculated as the actual in-cylinder gas temperature which is an estimate of an unburnt gas temperature within the cylinder. In this event, since the actual in-cylinder gas temperature can be utilized in the control of the internal EGR amount as well, the fuel injection control and the internal EGR control can be executed while sharing such an actual in-cylinder gas temperature. In addition, when the influence of the intake air temperature and the like is taken into consideration in the calculation of the actual in-cylinder gas temperature, it is possible to increase the accuracy of calculating the actual in-cylinder gas temperature, i.e., the actual internal EGR amount parameter, thereby making it possible to further improve the accuracy of calculating the fuel injection amount for producing a stratified air-fuel mixture.

Preferably, in the control method for an internal combustion engine described above, the actual internal EGR amount parameter calculating step includes calculating the actual internal EGR amount parameter as an actual in-cylinder gas temperature which is an estimate of an unburnt gas temperature within the cylinder.

This preferred embodiment of the control method provides the same advantageous effects as described above concerning the control apparatus according to the first aspect of the invention.

DETAILED DESCRIPTION OF THE EMBODIMENT

Figure 2:
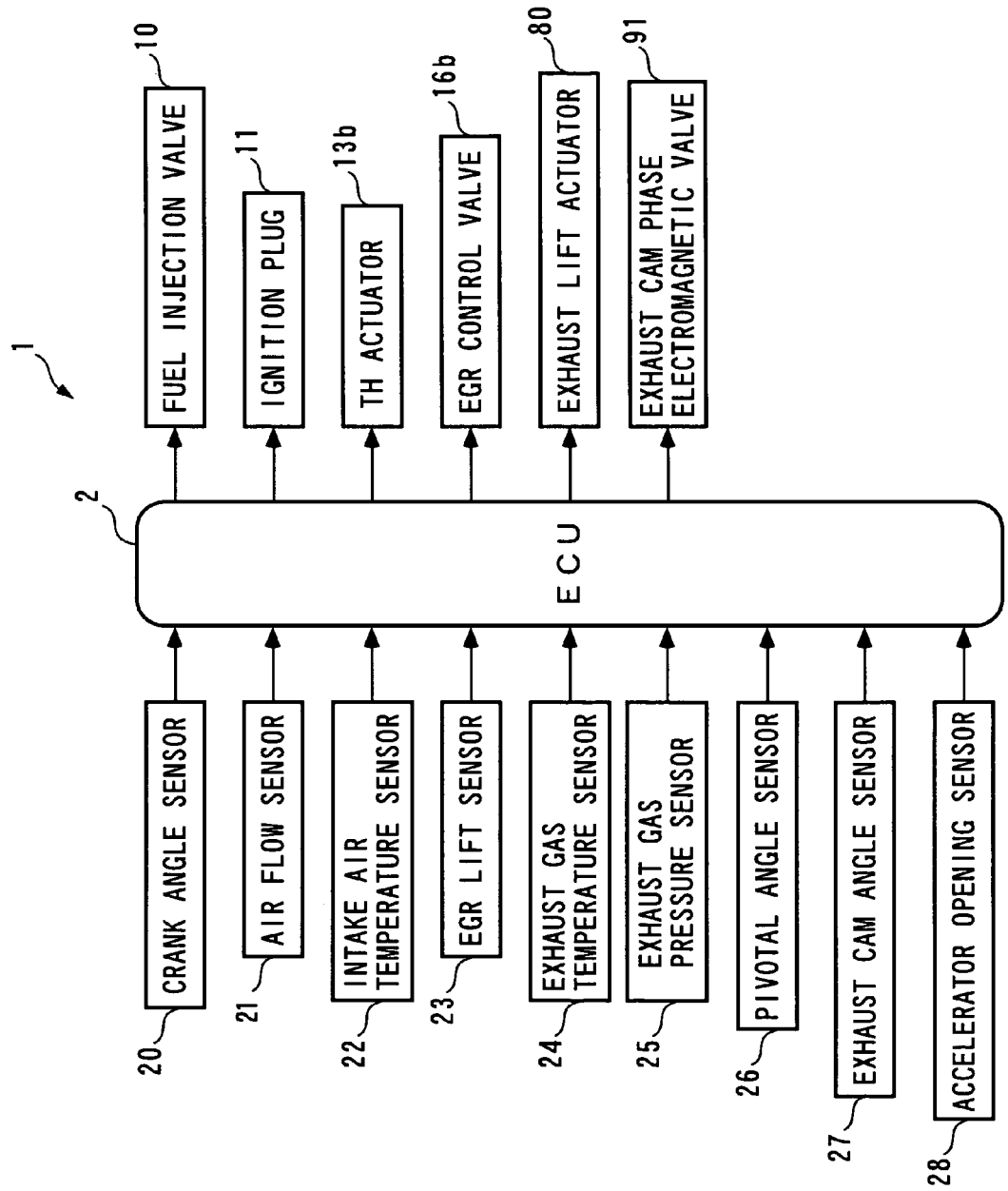
FIG. 2 is a block diagram generally showing the configuration of the control apparatus.

In the following, a control apparatus for an internal combustion engine according to one embodiment of the present invention will be described with reference to the drawings. As shown in FIG. 2, this control apparatus 1 comprises an ECU 2, and this ECU 2 executes a variety of control processes such as an EGR control process, a fuel injection control process and the like in accordance with an operating condition of the internal combustion engine (hereinafter referred to as the "engine") 3, as will be later described.

Figure 1:
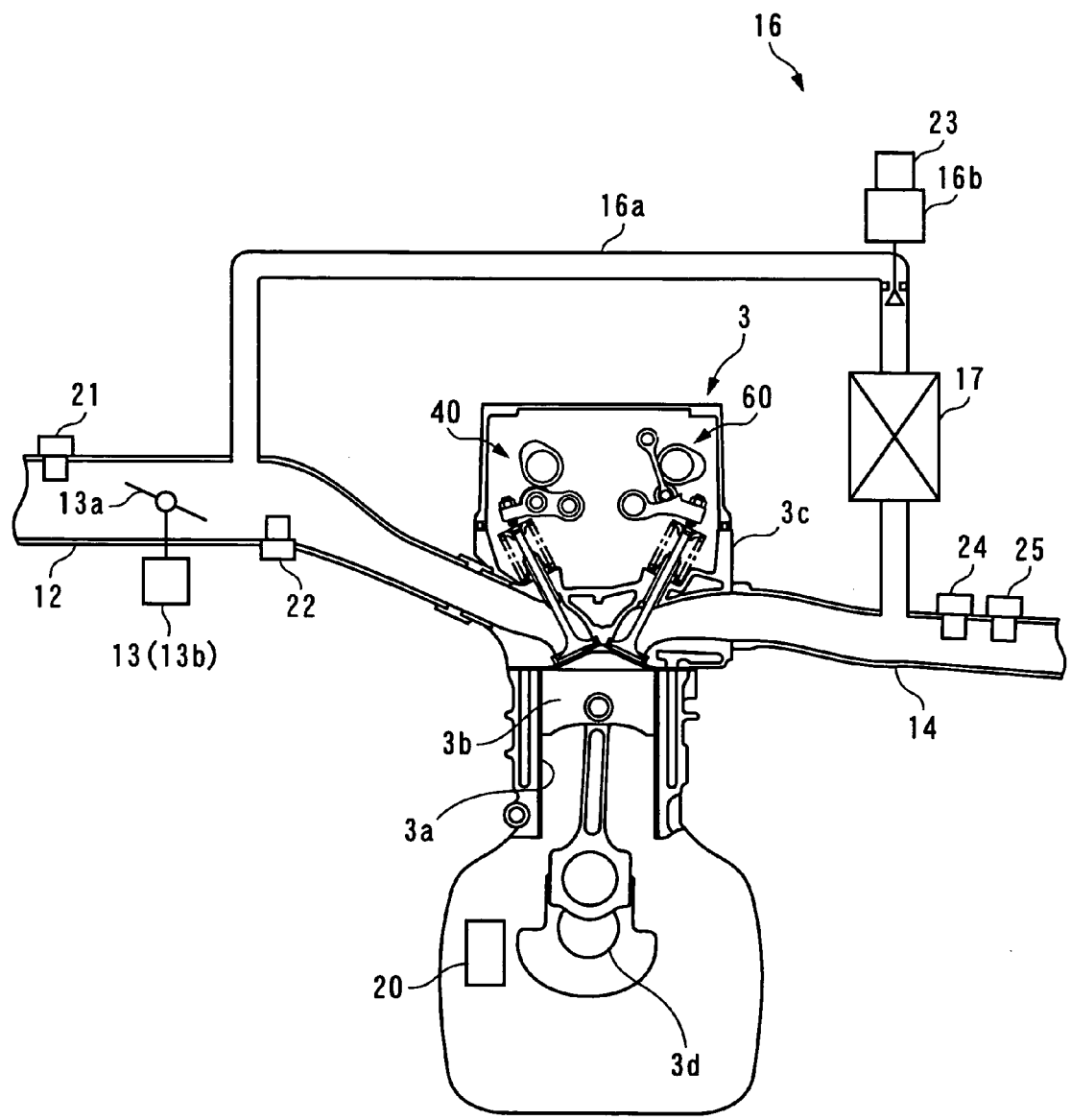
FIG. 1 is a diagram generally showing an internal combustion engine to which a control apparatus according to one embodiment of the present invention is applied.
Figure 3:
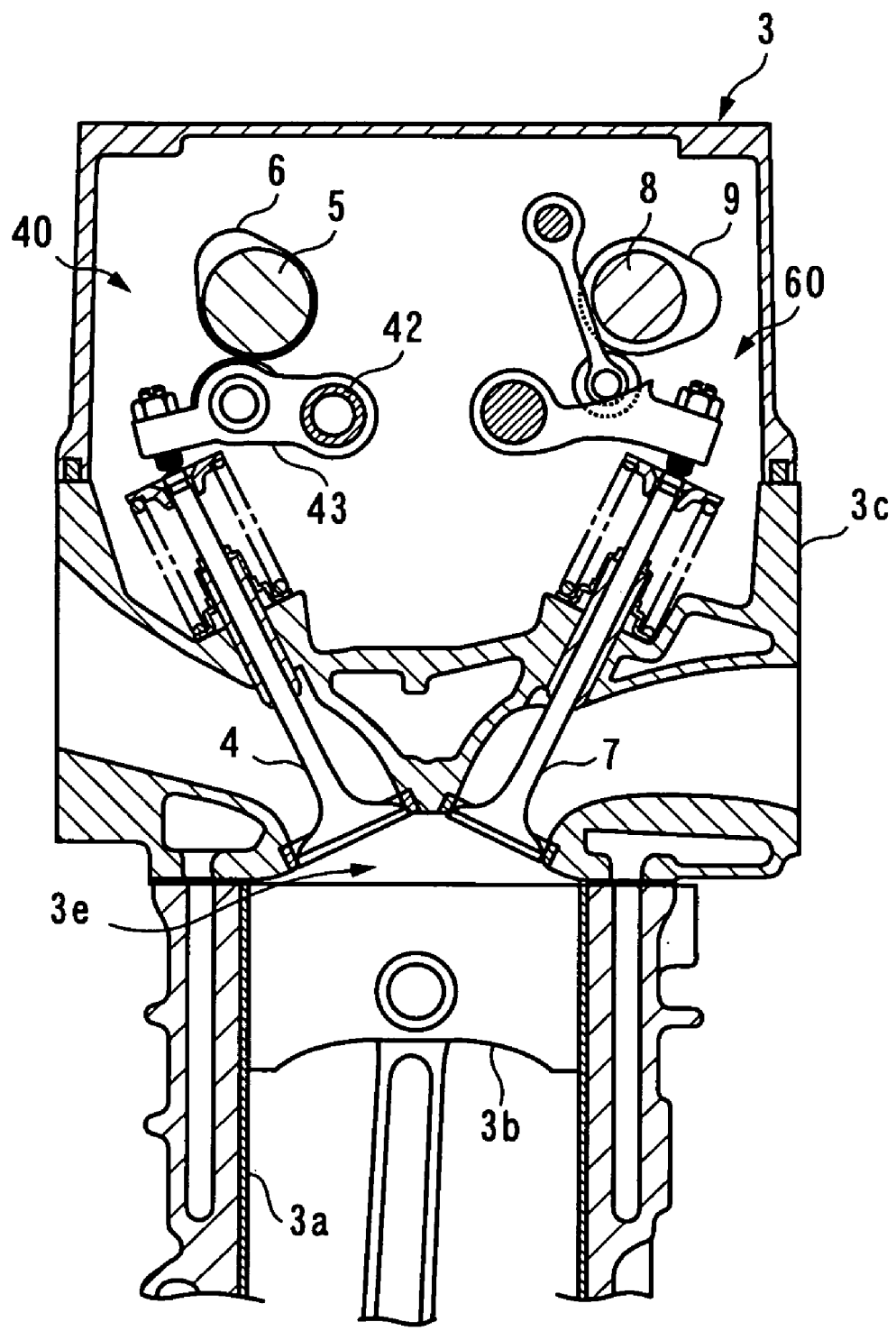
FIG. 3 is a cross-sectional view generally showing the configuration of an intake side valve actuation mechanism and an exhaust side valve actuation mechanism of the internal combustion engine.

As shown in FIGS. 1 and 3, the engine 3 is an in-line four-cylinder type four cycle gasoline engine which has four sets of cylinders 3a and pistons 3b (only one set of which is shown) and is equipped in a vehicle (not shown), and a combustion chamber 3e is formed between the piston 3b of each cylinder 3a and a cylinder head 3c.

The engine 3 comprises a pair of intake valves 4, 4 (only one of which is shown) provided for each cylinder 3a, a pair of exhaust gas valves 7, 7 (only one of which is shown), an intake side valve actuation mechanism 40 having an intake cam shaft 5, and an intake cam 6 for driving each intake air valve 4 to open and close, an exhaust side, an exhaust side valve actuation mechanism 60 having an exhaust cam shaft 8 and an exhaust cam 9 for driving each exhaust gas valve 7 to open and close, a fuel injection valve 10 (see FIG. 2) as a fuel injection device, an ignition plug 11 (see FIG. 2), and the like.

The intake cam shaft 5 and the exhaust cam shaft 8 are pivotably attached to the cylinder head 3c, respectively, through holders not shown, and extend along a direction in which the cylinders 3a are arranged. An intake sprocket (not shown) is axially disposed on one end of the intake cam shaft 5, and is rotatably provided.

This intake sprocket is fixed to the intake cam shaft 5, and is linked to the crank shaft 3d through a timing chain, not shown. With the foregoing configuration, the intake cam shaft 5 rotates once each time the crank shaft 3d rotates twice. Also, the intake cam 6 is provided on the intake cam shaft 5 for each cylinder 3a so as to integrally rotate therewith.

The intake side valve actuation mechanism 40 drives the intake air valve 4 of each cylinder 4 to open and close through the rotation of the intake cam shaft 5 associated with the rotation of the crank shaft 3d, and comprises an intake cam shaft 5, an intake cam 6, a rocker arm shaft 52, and two rocker arms 43, 43 (only one of which is shown), and the like. In this intake side valve actuation mechanism 40, as the intake cam shaft 5 rotates, the two rocker arms 43, 43 pivotally move about the rocker arm shaft 42, thereby driving the intake air valve 4 to open and close.

Further, an exhaust sprocket (not shown) is coaxially disposed and rotatably provided on one end of the exhaust cam shaft 8. This exhaust sprocket is linked to the crank shaft 3d through a timing chain, not shown, and is linked to the exhaust cam shaft 8 through an exhaust cam phase varying mechanism 90, later described. With the foregoing configuration, the exhaust cam shaft 8 rotates once as the crank shaft 3d rotates twice. Further, the exhaust cam 9 is provided on the exhaust cam shaft 8 for each cylinder 3a so as to integrally rotate therewith.

Further, the exhaust side valve actuation mechanism 60 drives the exhaust gas valve 7 of each cylinder 3a to open and close through the rotation of the exhaust cam shaft 8 associated with the rotation of the crank shaft 3d, and is comprised of a variable valve actuation mechanism for continuously changing a maximum lift and a valve timing of the exhaust gas valve 7, as will be later described. In this regard, in this embodiment, the "maximum lift of the exhaust gas valve 7 (hereinafter referred to as the "exhaust lift") represents a maximum lift stroke of the exhaust gas valve 7.

On the other hand, the fuel injection valve 10 is provided for each cylinder 3a, and is attached to the cylinder head 3c so as to directly inject a fuel into the combustion chamber 3e. In other words, the engine 3 is configured as a direct injection engine. Also, the fuel injection valve 10 is electrically connected to the ECU 2, and a valve opening time and a valve opening timing thereof are controlled by the ECU 2, as will be later described.

The ignition plug 11 is also provided for each cylinder 3a, and is attached to the cylinder head 3c. The ignition plug 11 is electrically connected to the ECU 2, and its discharge state is controlled by the ECU 2 such that an air-fuel mixture within the combustion chamber 3e is burnt at a timing in accordance with an ignition timing, later described.

On the other hand, the engine 3 is provided with a crank angle sensor 20 (operating condition parameter detecting means). This crank angle sensor 20 is comprised of a magnet rotor and an MRE pickup, and outputs a CRK signal and a TDC signal, both of which are pulse signals, to the ECU 2 as the crank shaft 3d rotates.

This CRK signal is such that one pulse is output per predetermined crank angle (for example, 10°), and the ECU 2 calculates the rotational speed of the engine 3 (hereinafter referred to as the "engine rotational speed") based on this CRK signal. The TDC signal in turn is a signal which indicates that the piston 3b of each cylinder 3a is present at a predetermined crank angle position slightly in front of the TDC position of an intake stroke, and one pulse is output per predetermined crank angle.

On the other hand, the intake pipe 12 of the engine 3 is provided with an air flow sensor 21, a throttle valve mechanism 13, and an intake air temperature sensor 22, respectively, in order from the upstream side. The air flow sensor 21 is comprised of a pyro air flow meter, detects the flow rate GIN of fresh air flowing through the intake pipe 12 (hereinafter referred to as the "fresh air flow rate"), and outputs a detection signal indicative of that to the ECU 2. The ECU 2 calculates an intake fresh air amount GCYL based on the detection signal of the air flow sensor 21.

The intake air temperature sensor 22 in turn detects the temperature TA of air flowing through the intake pipe 12 (hereinafter referred to as the "intake air temperature"), and outputs a detection signal indicative of that to the ECU 2.

The throttle valve mechanism 13 in turn comprises a throttle valve 13a, a TH actuator 13b for driving the same to open and close, and the like. The throttle valve 13a is pivotably provided in the middle of the intake pipe 12, and changes the fresh air amount GIN within the intake pipe 12 by a change in the opening associated with the pivotal movement.

The TH actuator 13b is a combination of a motor connected to the ECU with a gear mechanism (none of which is shown), and is driven by a control input from the ECU 2 to change the opening TH of the throttle valve 13a (hereinafter referred to as the "throttle valve opening"). With the foregoing configuration, the ECU 2 controls the throttle valve opening TH through the throttle valve mechanism 13.

The engine 3 is also provided with an exhaust gas recirculation mechanism 16. This exhaust gas recirculation mechanism 16 recirculates exhaust gases within the exhaust pipe 14 back toward the intake pipe 12, and is comprised of an EGR pipe 16 connected between the intake pipe 12 and the exhaust pipe 14, an EGR control valve 16b for opening and closing the EGR pipe 16a, and the like. The EGR pipe 16a has one end open to a portion of the exhaust pipe 14 upstream of a catalyzer (not show), and the other end open to a portion of the intake pipe downstream of the throttle valve mechanism 13.

The EGR control valve 16b in turn is of a linear electromagnetic valve type, and is configured to have its lift (hereinafter referred to as the "EGR lift") linearly change between a maximum value and a minimum value in accordance with a control input U_LIFT, later described, from the ECU 2, thereby changing the opening of the EGR pipe 16a, i.e., the amount of recirculated exhaust gases (hereinafter referred to as the "external EGR amount").

An EGR lift sensor 23 is attached to the EGR control valve 16b, such that the EGR lift sensor 23 detects an actual EGR lift LACT of the EGR control valve 16b, and outputs a detection signal indicative of that to the ECU 2. The ECU 2 controls the external EGR amount through the EGR control valve 16b, as will be later described. In this regard, in the following description, the recirculation of exhaust gases by the exhaust gas recirculation mechanism 16 is referred to as the "external EGR," and recirculated gases associated therewith are referred to as the "external EGR gases."

An EGR cooler 17 is also provided at a location of the EGR pipe 16a upstream of the EGR control valve 16b. This EGR cooler 17 is of a water cooling type which uses cooling water of the engine 3 as a coolant, and the external EGR gases are cooled down through heat exchange with the cooling water when they passes through the EGR cooler 17.

On the other hand, the exhaust pipe 14 is provided with an exhaust gas temperature sensor 24 and an exhaust gas pressure sensor 25, respectively. The exhaust gas temperature sensor 24 detects the temperature TEX of exhaust gases flowing through the exhaust pipe 14 (hereinafter referred to as the "exhaust gas temperature"), and outputs a detection signal indicative of that to the ECU 2. The exhaust gas pressure sensor 25 in turn detects the pressure PEX of the exhaust gases within the exhaust pipe 14, and outputs a detection signal indicative of that to the ECU 2.

Figure 4:
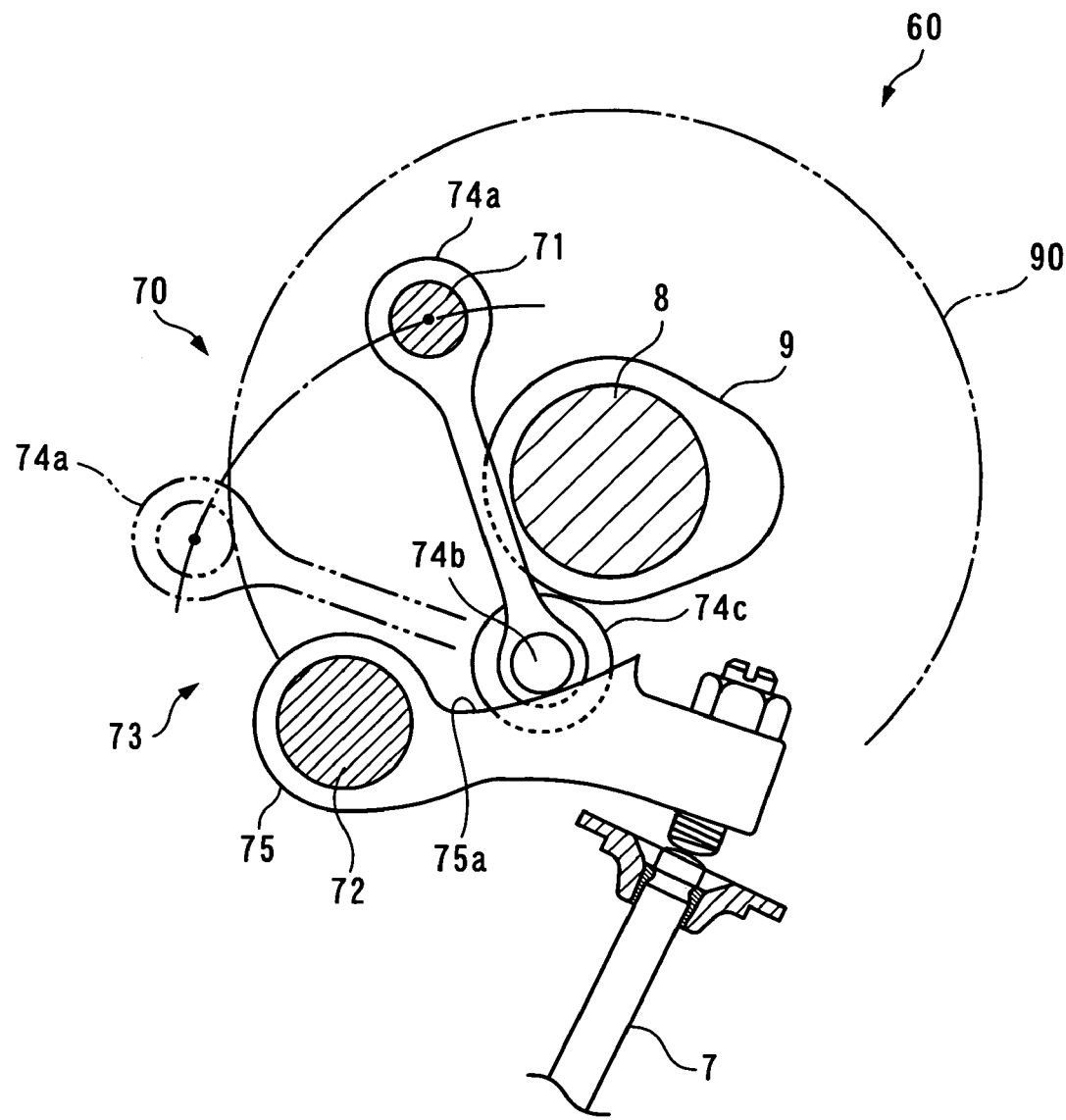
FIG. 4 is a schematic diagram generally showing the configuration of the exhaust side valve actuation mechanism.

Next, the aforementioned exhaust side valve actuation mechanism 60 will be described. As shown in FIG. 4, the exhaust side valve actuation mechanism 60 comprises an exhaust cam shaft 8, an exhaust cam 9, an exhaust lift varying mechanism 70, an exhaust cam phase varying mechanism 90, and the like. In this embodiment, the exhaust lift varying mechanism 70 and the exhaust cam phase varying mechanism 90 correspond to an internal EGR device.

Figure 5:
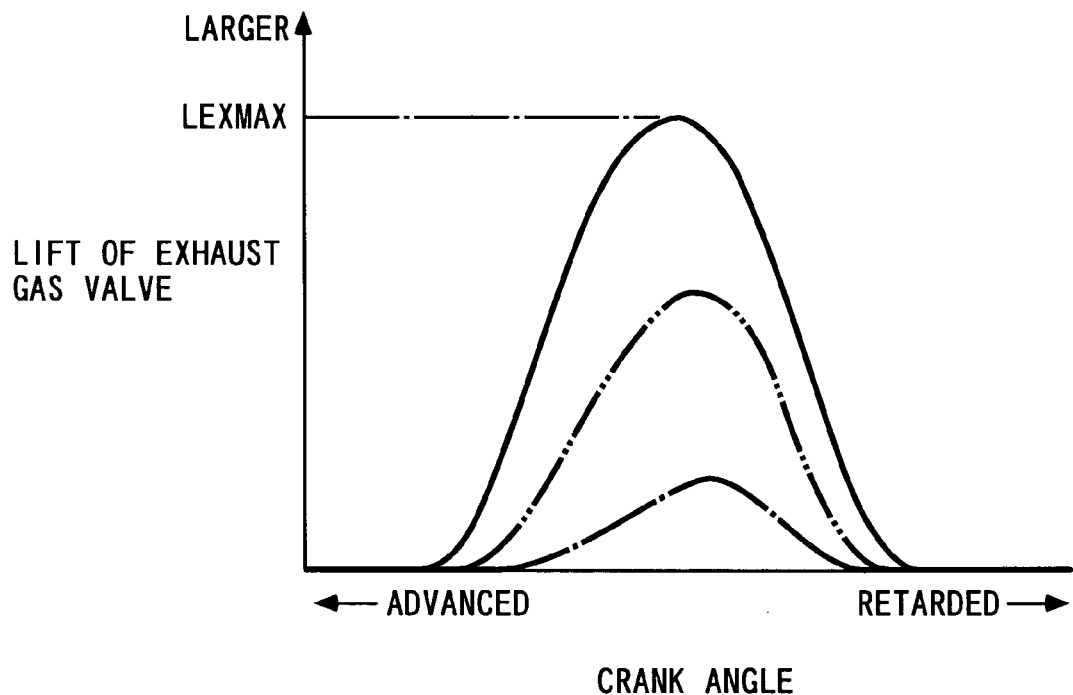
FIG. 5 is a diagram showing how an exhaust lift is changed by an exhaust lift varying mechanism.

The exhaust lift varying mechanism 70 drives the exhaust gas valve 7 to open and close through the rotation of the exhaust cam shaft 8 associated with the rotation of the crank shaft 3d, and continuously changes the exhaust lift between the value of zero and a predetermined maximum value LEXMAX (see FIG. 5), and is configured in a similar manner to that which has been previously proposed by the present applicant in Japanese Patent Application No. 2005-288057, so that its outline will be described in brief.

The exhaust lift varying mechanism 70 comprises a control shaft 71 and a rocker arm shaft 72, a rocker arm mechanism 73 provided on these shafts 71, 72 for each cylinder 3a, an exhaust lift actuator 80 (see FIG. 2) for simultaneously driving these rocker arm mechanisms 73, and the like.

The rocker arm mechanism 73 comprises a link 74a, a roller shaft 74b, a roller 74c, a rocker arm 75, and the like. The exhaust lift actuator 80 in turn is a combination of a motor, a deceleration gear mechanism (none of which is shown), and the like, and is electrically connected to the ECU 2, such that the exhaust lift actuator 80, as driven by a control input U_SAAEX, later described, from the ECU 2, pivotally moves the control shaft 71, thereby pivotally moving the link 74a about the roller shaft 74b.

When the link 74a is at a zero lift position indicated by solid lines in FIG. 4, the exhaust cam 9 rotates, and the roller 74c is pressed toward the rocker arm shaft 72 by its cam nose, causing the link 74a to pivotally move about the control shaft 71 in the clockwise direction in FIG. 4. In this event, a guide face 75a of the rocker arm 75 has a shape which matches an arc about the control shaft 71, so that the rocker arm 75 is held at a valve closing position shown in FIG. 4 by an urging force of a valve spring. In this way, the exhaust lift is held at the value of zero, and the exhaust gas valve 7 is held in a closed valve state.

On the other hand, when the link 74a has pivotally moved from the zero lift position to the position toward the maximum lift position (position indicated by a two-dot chain line in FIG. 4) and remains held at that position, as the link 74a pivotally moves about the control shaft 71 in the clockwise direction in FIG. 4 by the rotation of the exhaust cam 9, the rocker arm 75 pivotally moves downward from the valve closing position shown in FIG. 4, while resisting against an urging force of the valve spring, to open the exhaust gas valve 7. In this event, the amount of pivotal movement of the rocker arm 75, i.e., the exhaust lift, is larger as the link 74a is present at a position closer to the maximum lift position side.

For the reason set forth above, the exhaust gas valve 7 opens with a larger lift as the link 74a is present at a position closer to the maximum lift position side. More specifically, while the exhaust cam 9 is rotating, the exhaust gas valve 7 opens in conformity to a valve lift curve indicated by a solid line in FIG. 5 when the link 74a is present at the maximum lift position, and the exhaust lift indicates its maximum value LEXMAX. Therefore, in the exhaust lift varying mechanism 70, the exhaust lift can be continuously changed between the value of zero and the predetermined maximum value LEXMAX by pivotally moving the link 74a between the zero lift position and the maximum lift position. In this event, as represented by valve lift curves indicated by a two-dot chain line and a one-dot chain line, a valve opening timing of the exhaust gas valve 7 is delayed more, and simultaneously with this, a valve closing timing is advanced more, as the exhaust lift is smaller.

The exhaust lift varying mechanism 70 is also provided with a pivotal angle sensor 26 (see FIG. 2). The pivotal angle sensor 26 detects a pivotal angle SAAEX of the control shaft 71, and outputs a detection signal indicative of that to the ECU 2. In this embodiment, the pivotal angle sensor 26 corresponds to an operating condition parameter detecting means, and the pivotal angle SAAEX corresponds to an operating condition parameter.

Next, the exhaust cam phase varying mechanism 90 will be described. The exhaust cam phase varying mechanism 90 continuously changes a relative phase CAEX of the exhaust cam shaft 8 to the crank shaft 3d (hereinafter referred to as the "exhaust cam phase") to an advance side or to a retard side. This exhaust cam phase varying mechanism 90 is configured in a similar manner to that which has been previously proposed by the present applicant in Japanese Patent Application No. 2005-315161, so that its outline will be simply described in brief.

Figure 6:
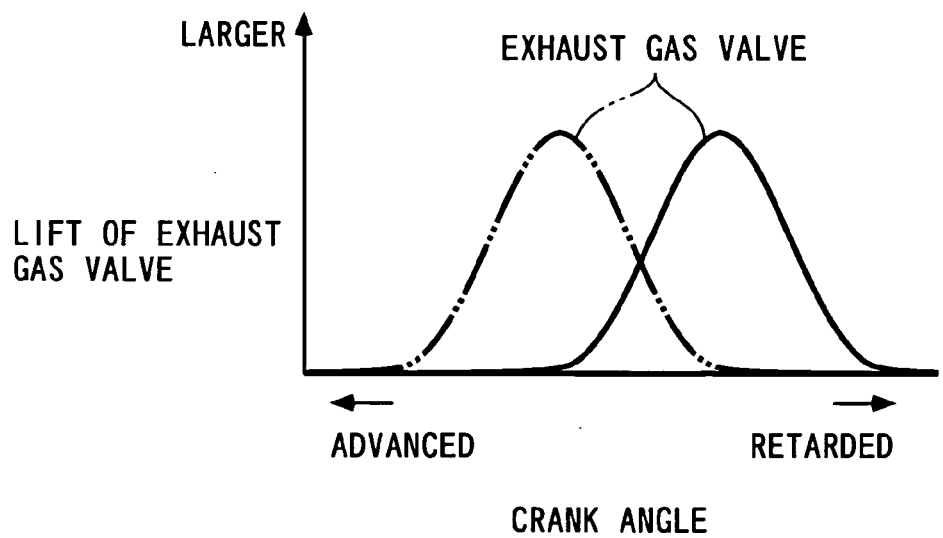
FIG. 6 is a diagram showing a valve lift curve of an exhaust gas valve when an exhaust cam phase is set at the most retarded value (solid line) and the most advanced value (two-dot chain line) by an exhaust cam phase varying mechanism.

The exhaust cam phase varying mechanism 90 is provided at an end of the exhaust cam shaft 8 closer to the exhaust sprocket, and comprises an exhaust cam phase electromagnetic valve 91, an advance chamber and a retard chamber (none of which is shown) to which a hydraulic pressure is supplied therethrough, and the like. The exhaust cam phase electromagnetic valve 91 is connected to the ECU 2, and changes the hydraulic pressure supplied to the advance chamber and the retard chamber in accordance with a control input U_CAEX, later described, from the ECU 2, thereby continuously changing the exhaust cam phase CAEX between a predetermined most retard value and a predetermined most advance value. In this way, the valve timing of the exhaust gas valve 7 is continuously changed between the most retarded timing indicated by a solid line in FIG. 6 and the most advanced timing indicated by a two-dot chain line in FIG. 6.

On the other hand, an exhaust cam angle sensor 27 (see FIG. 2) is provided at an end of the exhaust cam shaft 8 opposite to the exhaust cam phase varying mechanism 90. The exhaust cam angle sensor 27 is comprised, for example, of a magnet rotor and an MRE pickup, and outputs an EXCAM signal, which is a pulse signal, to the ECU 2 every predetermined cam angle (for example, 1°) in association with the rotation of the exhaust cam shaft 8. The ECU 2 calculates the exhaust cam phase CAEX based on the EXCAM signal and the aforementioned CRK signal. In this embodiment, the exhaust cam phase sensor 27 corresponds to an operating condition parameter detecting means, and the exhaust cam phase CAEX corresponds to an operating condition parameter.

As described above, in this engine 3, the lift and the valve timing of the exhaust gas valve 7 can be continuously changed by the exhaust lift varying mechanism 70 and the exhaust cam phase varying mechanism 90, thereby making it possible to freely change the amount of previously burnt gases remaining in the cylinder 3a, i.e., the internal EGR amount. The previously burnt gases present a temperature higher than that of exhaust gases which are recirculated by the exhaust gas recirculation mechanism 16.

An accelerator opening sensor 28 is also connected to the ECU 2. The accelerator opening sensor 28 detects an accelerator opening AP which is a manipulation amount of an accelerator pedal, not shown, and outputs a detection signal indicative of that to the ECU 2.

The ECU 2 in turn is based on a microcomputer which is comprised of an I/O interface, a CPU, a RAM, a ROM and the like, and determines the operating condition of the engine 3 and executes a variety of control processes in accordance with the detection signals from a variety of sensors 20-28 mentioned above.

Specifically, the ECU 2 executes an EGR control process, a fuel injection control process, an ignition timing control process and the like in accordance with the operating condition of the engine 3, as will be later described. Through these control processes, the engine 3 is operated in any operation mode in accordance with a combustion mode value STS_BURNCMD, later described, out of a stratified self ignition combustion mode, a stratified flame propagation combustion mode, a torch self ignition combustion mode, and a homogeneous flame propagation combustion mode.

The stratified self ignition combustion mode involves injecting a fuel only in a compression stroke to produce a stratified air-fuel mixture which is burnt with self ignition, and is executed when an operation range of the engine 3 is in a first predetermined operation range, more specifically, when the engine rotational speed NE is in a predetermined low rotational speed range and a required torque, later described, is in a predetermined low load range. In this regard, since the stratified air-fuel mixture is produced so as to burn with self ignition in the stratified self ignition combustion mode, a spark ignition is not essentially required. However, with the intention to prevent misfire and appropriately control a self ignition combustion timing, the ignition timing control process, later described, of this embodiment involves auxiliarily executing a spark ignition with the ignition plug 11 even in the stratified self ignition combustion mode.

The stratified flame propagation combustion mode in turn involves injecting a fuel only in a compression mode to produce a stratified air-fuel mixture which is burnt with flame propagation with a spark ignition, and is executed when the operation range of the engine 3 is in a predetermined second operation range (a low-middle rotational speed range and a lower load range than the first operation range, where the stratified air-fuel mixture is not apt to burn with self ignition).

Further, the torch self ignition combustion mode burns an air-fuel mixture as described below. Specifically, in a combustion cycle, a fuel is first injected in an intake stroke to produce a homogeneous air-fuel mixture. Next, a trace of the fuel is injected in a compression stroke to cause the stratified air-fuel mixture to concentrate near the ignition plug 11, and the air-fuel mixture is produced such that the homogeneous air-fuel mixture surrounds the stratified air-fuel mixture. Then, the stratified air-fuel mixture is burnt with flame propagation with a spark ignition through the ignition plug 11 to increase the temperature within the cylinder, thereby burning the homogeneous air-fuel mixture with self ignition. This torch self ignition combustion mode is executed when the operation range of the engine 3 is in a predetermined third operation range (a low-middle rotational speed range and a higher load range than the first operation range).

On the other hand, the homogeneous flame propagation combustion mode involves injecting a fuel in an intake stroke to produce a homogeneous air-fuel mixture, and burning the same with flame propagation with a spark ignition, and is executed when the operation range of the engine 3 is in a predetermined fourth operation range other than the aforementioned first, second, and third operation ranges.

In this embodiment, the ECU 2 corresponds to an internal EGR control means, an actual internal EGR amount parameter calculating means, a target internal EGR amount parameter calculating means, a index value calculating means, a fuel injection amount calculating means, a fuel injection control means, a correcting means, a failure determining means, and an operating condition parameter detecting means.

Figure 7:
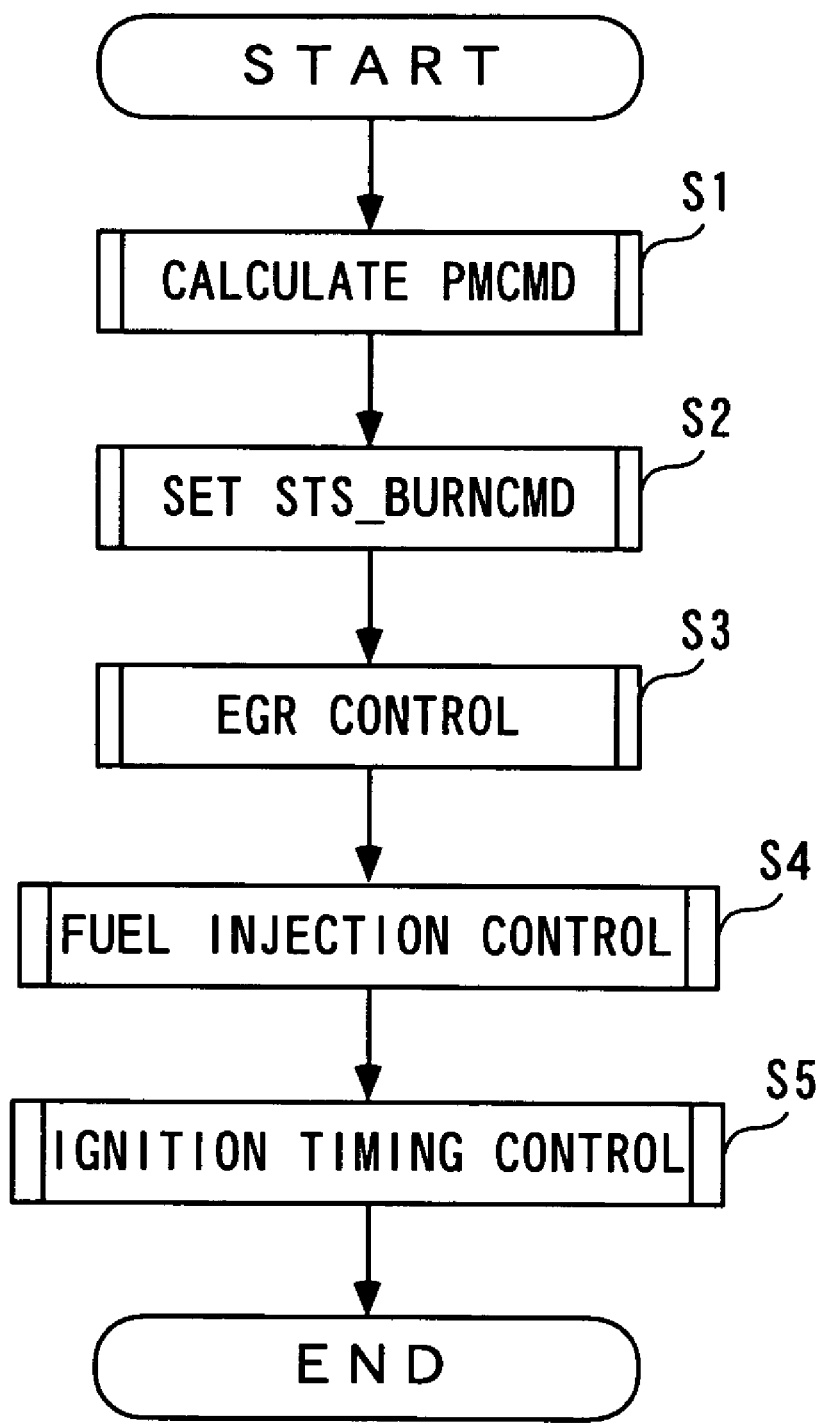
FIG. 7 is a flow chart showing a control process which is executed at a predetermined control period.

In the following, a variety of control processes executed by the ECU 2 at a predetermined control period will be described with reference to FIG. 7. Assume that a variety of values calculated or set in the following control processes are stored in the RAM of the ECU 2.

In this process, first at step 1 (abbreviated as "S1" in the figure. The same is applied to the following description), a required torque PMCMD is calculated. This required torque PMCMD is specifically calculated by searching a map, not shown, in accordance with the engine rotational speed NE and the accelerator opening AP.

Next, at step 2, a combustion mode value STS_BURNCMD is set. The combustion mode value STS_BURNCMD is set by searching a map, not shown, in accordance with the engine rotational speed NE and the required torque PMCMD to determine in which of the aforementioned first to fourth operation range the engine 3 is present, and relying on the result of the determination.

Specifically, the combustion mode value STS_BURNCMD is set to the value of one when the operation range of the engine 3 is in the first operation range in which the stratified self ignition combustion mode should be executed; to the value of two when in the second operation range in which the stratified flame propagation combustion mode; to the value of three when in the third operation range in which the torch self ignition combustion mode is executed; and to the value of four when the homogeneous flame propagation combustion mode should be executed, respectively.

Next, at step 3, the EGR control process is executed. Details of the EGR control process will be described later.

At step 4 subsequent to step 3, the fuel injection control process is executed. Details of the fuel injection control process will be described later.

Next, at step 5, the ignition timing control process is executed. Though not shown, in the ignition timing control process, an ignition timing optimal for executing the aforementioned four combustion modes is calculated in accordance with the aforementioned combustion mode value STS_BURNCMD and the operating condition of the engine 3. In particular, when STS_BURNCMD=3 so that the operation range of the engine 3 is in an operation range in which the torch self ignition combustion mode should be executed, the ignition timing is calculated so as to be an optimal value for burning a surrounding homogeneous air-fuel mixture with self ignition using a stratified air-fuel mixture as a torch.

After executing the ignition timing control process at step 5 in the foregoing manner, this process is terminated.

Next, the aforementioned EGR control process will be described with reference to FIG. 8. As described below, the EGR control process involves calculating a control input U_LIFT to the EGR control valve 17b in order to control the external EGR amount through the exhaust gas recirculation mechanism 16, and calculating control inputs U_SAAEX, U_CAEX to the exhaust lift actuator 80 and the exhaust cam phase electromagnetic valve 91 in order to control the internal EGR amount through the exhaust lift varying mechanism 70 and the exhaust cam phase varying mechanism 90.

Figure 8:
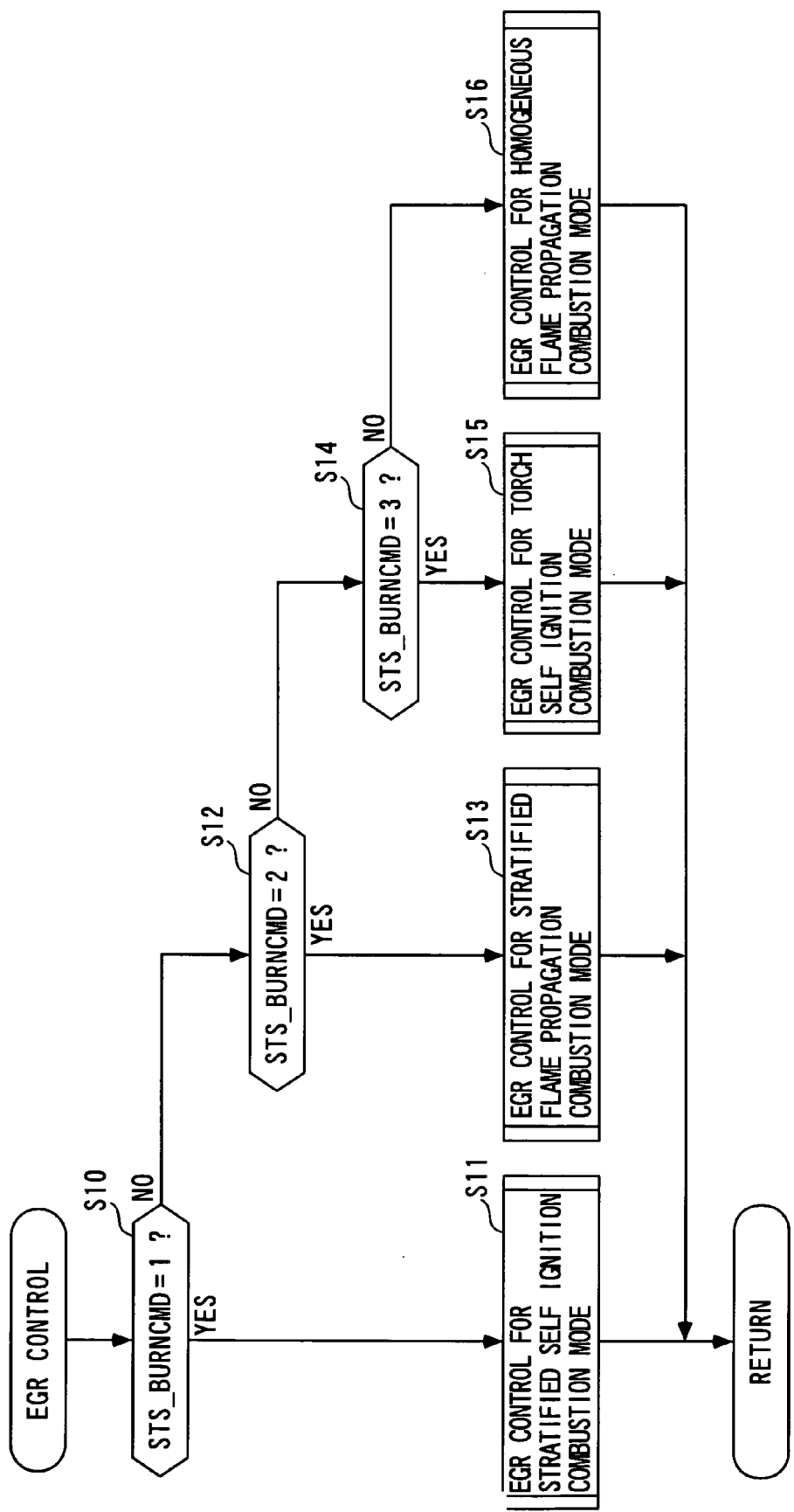
FIG. 8 is a flow chart showing an EGR control process.

As shown in FIG. 8, first at step 10, it is determined whether or not the combustion mode value STS_BURNCMD has the value of one. When the result of this determination is YES, indicating that the operation range of the engine 3 is in the first operation range in which the stratified self ignition combustion mode should be executed, the process goes to step 11, where the EGR control process for the stratified self ignition combustion mode is executed.

In this control process, though specific contents thereof are not shown, values of three control inputs U_LIFT, U_SAAEX, U_CAEX for the stratified self ignition combustion mode are calculated in accordance with the operating condition of the engine 3, and the external EGR amount and the internal EGR amount are controlled, respectively, with these control inputs. In this regard, at step 11, the control input U_LIFT is calculated as the value of zero, whereby the external EGR amount is controlled to be the value of zero. Subsequently, this process is terminated.

On the other hand, when the result of the determination at step 10 is NO, the process goes to step 12, where it is determined whether or not the combustion mode value STS_BURNCDM has the value of two. When the result of this determination is YES, indicating that the operation range of the engine 3 is in the second operation range in which the stratified flame propagation combustion mode should be executed, the process goes to step 13, where the EGR control process for the stratified flame propagation combustion mode is executed.

In the control process at step 13, though specific contents thereof are not shown, values of three control inputs U_LIFT, U_SAAEX, U_CAEX for the stratified flame propagation combustion mode are calculated in accordance with the operating condition of the engine 3, and the external EGR amount and the internal EGR amount are controlled, respectively, with these control inputs. In this regard, at step 13, the control input U_LIFT is calculated as the value of zero, as is the case with step 11, whereby the external EGR amount is controlled to be the value of zero. Subsequently, this process is terminated.

Figure 9:
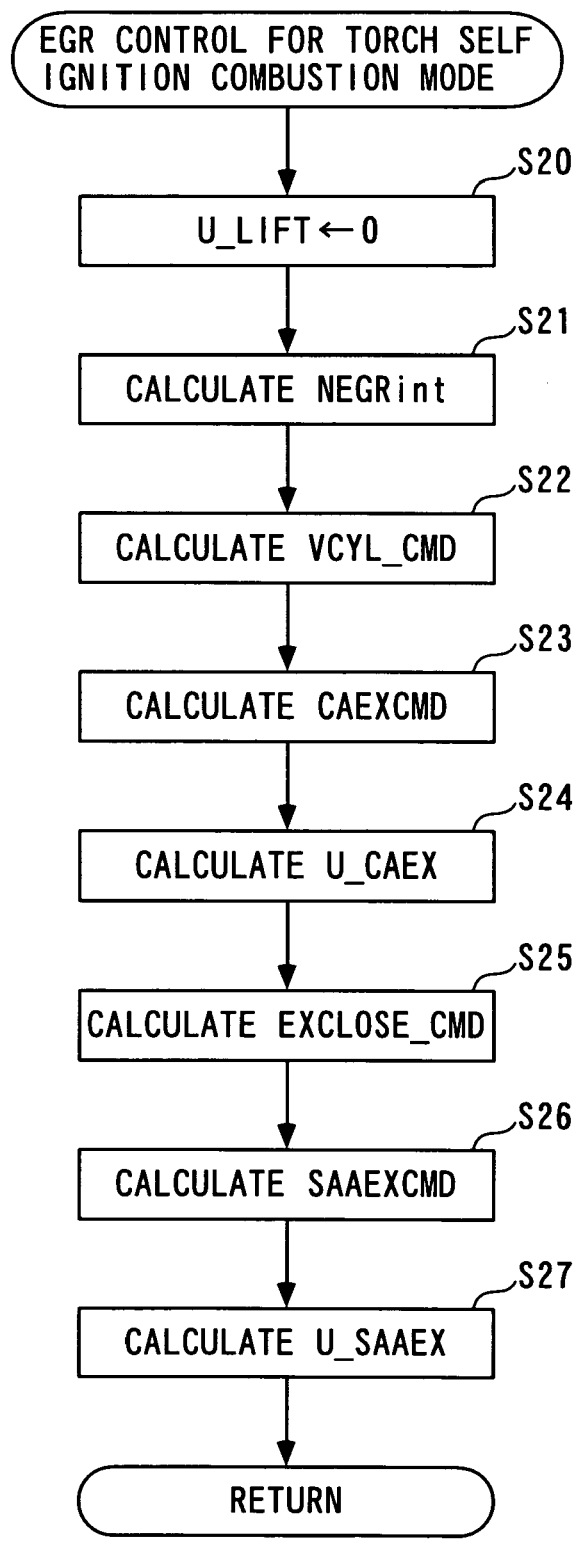
FIG. 9 is a flow chart showing an EGR control process for a torch self ignition combustion mode.

On the other hand, when the result of the determination at step 12 is NO, the process goes to step 14, where it is determined whether or not the combustion mode value STS_BURNCMD has the value of three. When the result of this determination is YES, indicating that the operation range of the engine 3 is in the third operation range in which the torch self ignition combustion mode should be executed, the process goes to step 15, where the EGR control process for the torch self ignition combustion mode is executed. This control process is specifically executed as shown in FIG. 9.

First, at step 20, the control input U_LIFT is se to the value of zero. As a consequence, the external EGR value is controlled to be the value of zero.

Next, the process goes to step 21, where a target internal EGR amount NEGRint is calculated. Specifically, the target internal EGR amount NEGRint is calculated by searching a map, not shown, in accordance with the engine rotational speed NE and the required torque PMCMD.

Next, at step 22, a target cylinder volume VCYL_CMD is calculated by using a gas state equation based on the target internal EGR amount NEGRint, an exhaust gas temperature TEX, and an exhaust gas pressure PEX.

At step 23 subsequent to step 22, a target exhaust cam phase CAEXCMD is calculated by searching a map, not shown, in accordance with the target internal EGR amount NEGRint, the exhaust gas temperature TEX, and the exhaust gas pressure PEX. Subsequently, the process goes to step 24, where the control unit U_CAEX is calculated by a predetermined control approach (for example, a map search, a feedback control algorithm or the like) such that the exhaust cam phase CAEX reaches the target exhaust cam phase CAEX-CMD.

Next, at step 25, a target exhaust closing angle EXCLOSE_CMD is calculated by a predetermined processing approach (for example, map search) based on the target cylinder volume VCYL_CMD. The target exhaust closing angle EXCLOSE_CMD indicates a crank angle which is a target for a valve closing timing of the exhaust gas valve 7, and corresponds to a target internal EGR amount parameter in this embodiment.

At step 26 subsequent to step 25, a target pivotal angle SAAEXCMD is calculated by searching a map, not shown, in accordance with the target exhaust closing angle EXCLOSE_CMD and the exhaust cam phase CAEX.

Next, at step 27, the control input U_SAAEX is calculated by a predetermined control approach (for example, map search, feedback control algorithm or the like) such that the pivotal angle SAAEX reaches the target pivotal angle SAAEXCMD, followed by the termination of this process. In the foregoing manner, the two control inputs U_CAEX, U_SAAEX are calculated at steps 24, 27 to control the internal EGR amount such that it reaches the target internal EGR amount NEGRint.

Turning back to FIG. 8, the EGR control process for the torch self ignition combustion mode is executed at step 15 in the foregoing manner, followed by the termination of this process.

On the other hand, when the result of the determination at step 14 is NO, indicating that the operation range of the engine 3 is in the fourth operation range in which the homogeneous flame propagation combustion mode should be executed, the process goes to step 16, where the EGR control process for the homogeneous flame propagation combustion mode is executed. In this control process, though specific contents are not shown, the values of three control inputs U_LIFT, U_SAAEX, U_CAEX for the homogeneous flame propagation combustion mode are calculated in accordance with the operating condition of the engine 3, and the external EGR amount and the internal EGR amount are controlled by the control inputs, respectively. Subsequently, this process is terminated.

Figure 10:
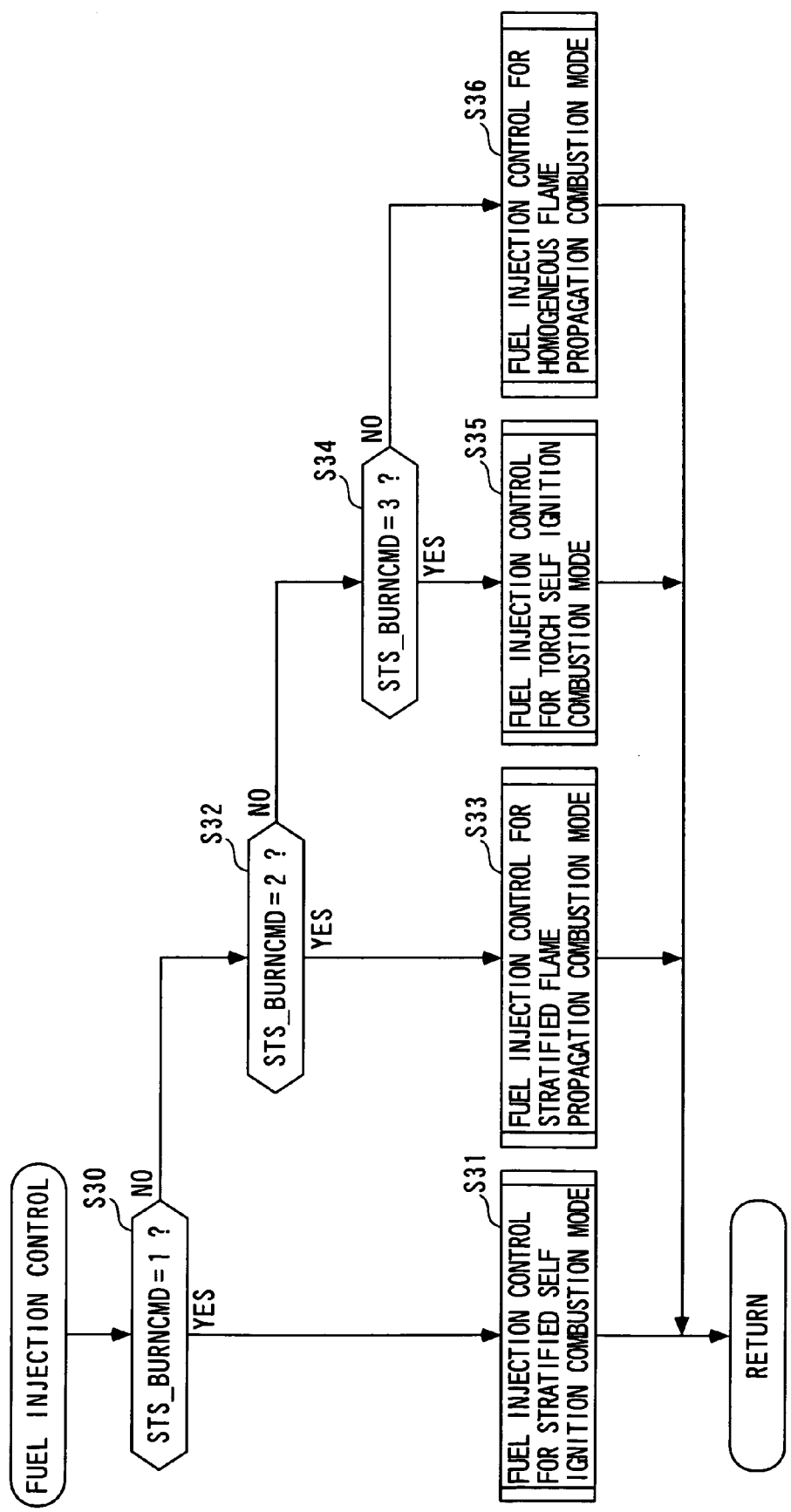
FIG. 10 is a flow chart showing a fuel injection control process.

Next, the aforementioned fuel injection control process will be described. Specifically, this fuel injection control process is performed as shown in FIG. 10. First, at step 30, it is determined whether or not the combustion mode value STS_BURNCMD has the value of one.

When the result of this determination is YES, indicating that the operation range of the engine 3 is in the first operation range in which the stratified self ignition combustion mode should be executed, the process goes to step 31, where the fuel injection control process for the stratified self ignition combustion mode is executed. Though not shown, this control process is specifically executed as described below.

First, a fuel injection amount GUFUEL2 for producing a stratified air-fuel mixture is calculated by a predetermined processing approach including a map search using a variety of operating condition parameters such as the engine rotational speed NE, the required torque PMCMD and the like. Next, a fuel injection timing for the stratified self ignition combustion mode is calculated by searching a map, not shown, in accordance with the fuel injection amount GFUEL2 for producing the stratified air-fuel mixture, and the engine rotational speed NE. The fuel injection timing for the stratified self ignition combustion mode is calculated as a timing in a compression stroke. Subsequently, this process is terminated. In this way, the fuel in an amount equal to the calculated fuel injection amount GFUEL2 for producing the stratified air-fuel mixture is injected from the fuel injection valve 10 into the combustion chamber 3*e* at the calculated fuel injection timing for the stratified self ignition combustion mode, and as a result, a stratified air-fuel mixture suitable for the stratified self ignition combustion is produced within the combustion chamber 3*e*.

On the other hand, when the result of the determination at step 30 is NO, the process goes to step 32, where it is determined whether or not the combustion mode value STS_BURNCMD has the value of two. When the result of this determination is YES, indicating that the operation range of the engine 3 is in the second operation range in which the stratified flame propagation combustion mode should be executed, the process goes to step 33, where the fuel injection control process for the stratified flame propagation combustion mode is executed. Though not shown, this control process is specifically executed as described below.

First, the fuel injection amount GFUEL2 for producing a stratified air-fuel mixture is calculated by the same approach as that used at step 31. Next, a fuel injection timing for the stratified flame propagation combustion mode is calculated by searching a map, not shown, in accordance with the fuel injection amount GFUEL2 for producing the stratified air-fuel mixture and the engine rotational speed NE. This fuel injection timing for the stratified flame propagation combustion mode is calculated as a timing in a compression stroke. Subsequently, this process is terminated. In this way, the fuel in an amount equal to the calculated fuel injection amount GFUEL2 for producing the stratified air-fuel mixture is injected from the fuel injection valve 10 into the combustion chamber 3*e* at the calculated fuel injection timing for the stratified flame propagation combustion mode, and as a result, a stratified air-fuel mixture suitable for the stratified flame propagation combustion is produced within the combustion chamber 3*e*.

Figure 11:
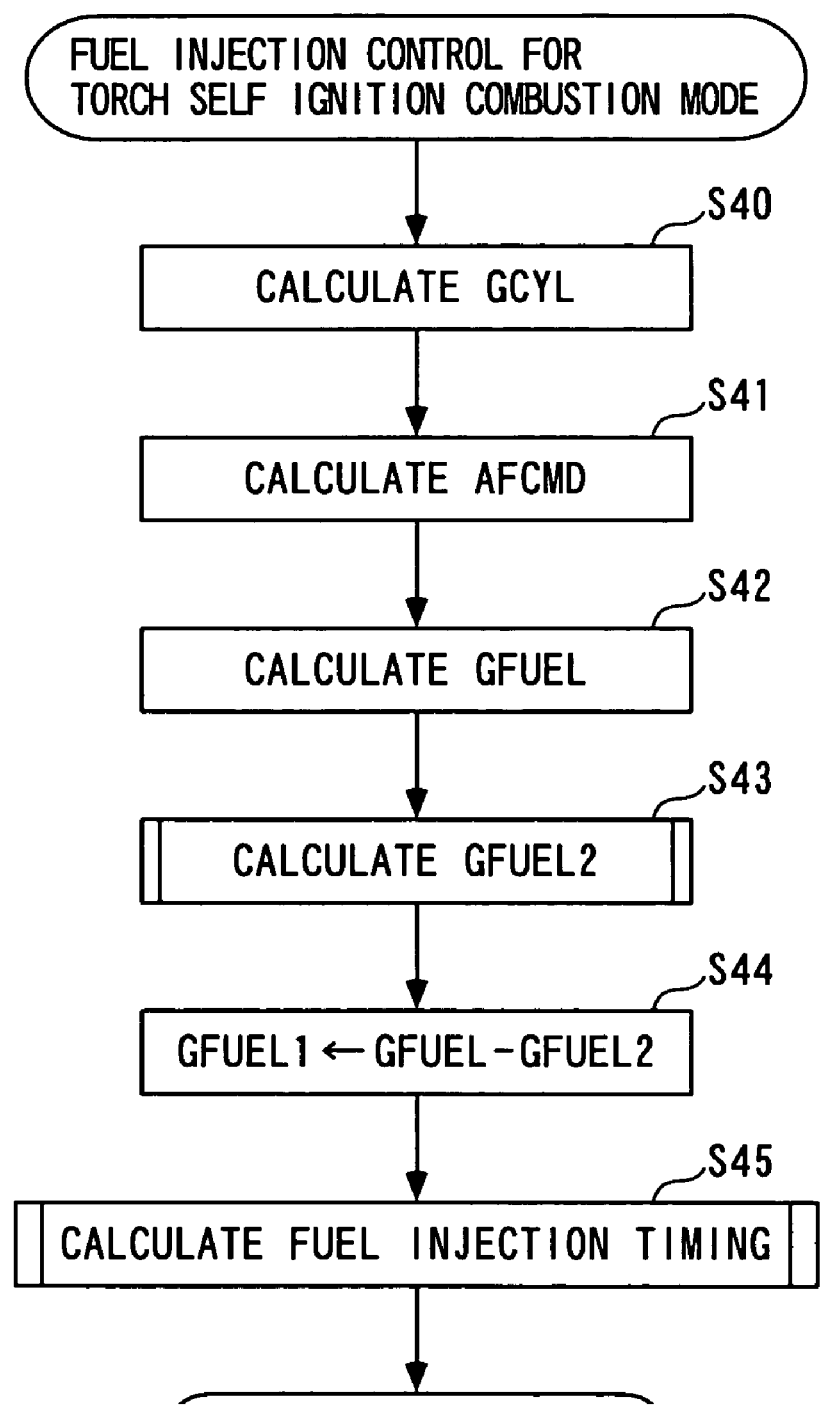
FIG. 11 is a flow chart showing a fuel injection control process for the torch self ignition combustion mode.

On the other hand, when the result of the determination at step 32 is NO, the process goes to step 34, where it is determined whether or not the combustion mode value STS_BURNCMD has the value of three. When the result of this determination is YES, indicating that the operation range of the engine 3 is in the third operation range in which the torch self ignition combustion mode should be executed, the process goes to step 35, where the fuel injection control process for the torch self ignition combustion mode is executed. Specifically, this control process is executed as shown in FIG. 11.

First, at step 40, an intake fresh air amount GCYL is calculated by a predetermined processing approach (for example, map search or calculation equation) based on the engine rotational speed NE and a fresh air flow amount GIN. Subsequently, at step 41, a target air-fuel ratio AFCMD is calculated by searching a map, not shown, in accordance with the engine rotational speed NE and the required torque PMCMD.

Next, at step 42, a total fuel injection amount GFUEL is calculated by searching a map, not shown, in accordance with the engine rotational speed and the intake fresh air amount GCYL. Next, the process goes to step 43, where a fuel injection amount GFUEL2 for producing a stratified air-fuel mixture is calculated by a processing approach shown in FIG. 12.

Specifically, at step 60, it is determined whether or not a failure determination flag F_FS is "1." When the result of this determination is NO, the process goes to step 61, where an actual exhaust closing angle EXCLOSE_ACT (actual internal EGR amount parameter) is calculated by searching a map, not shown, in accordance with the exhaust cam phase CAEX and the pivotal angle SAAEX. This actual exhaust closing angle EXCLOSE_ACT is an estimated value of an actual valve closing timing (crank angle) of the exhaust gas valve 7, and represents an actual internal EGR amount.

Next, at step 62, a closing angle deviation dE (index value) is set to a deviation EXCLOSE_CMD-EXCLOSE_ACT of the actual exhaust closing angle EXCLOSE_ACT from the target exhaust closing angle EXCLOSE_CMD.

Next, at step 63, it is determined whether or not the closing angle deviation dE is equal to or larger than a predetermined upper limit value dEmax (predetermined degree). When the result of this determination is YES, the process goes to step 64, where a count value CT of a failure determination counter is set to the sum CTZ+STIME of its preceding value CTZ and a predetermined value STIME. An initial value for the preceding value is set to the value of zero, while the predetermined value STIME is set to a constant positive value.

On the other hand, when the result of the determination at step 63 is NO, the process goes to step 65, where the count value CT of the failure determination counter is reset to zero.

At step 66 subsequent to step 64 or 65, it is determined whether or not the count value CT of the failure determination counter is equal to or larger than a predetermined threshold value CTREF (value corresponding to a predetermined time). When the result of this determination is NO, the process goes to step 67, where a basic value GFUEL2_MAP for the fuel injection amount GFUEL2 for producing a stratified air-fuel mixture is calculated by searching a map, not shown, in accordance with the engine rotational speed NE and the required torque PMCMD.

Figure 13:
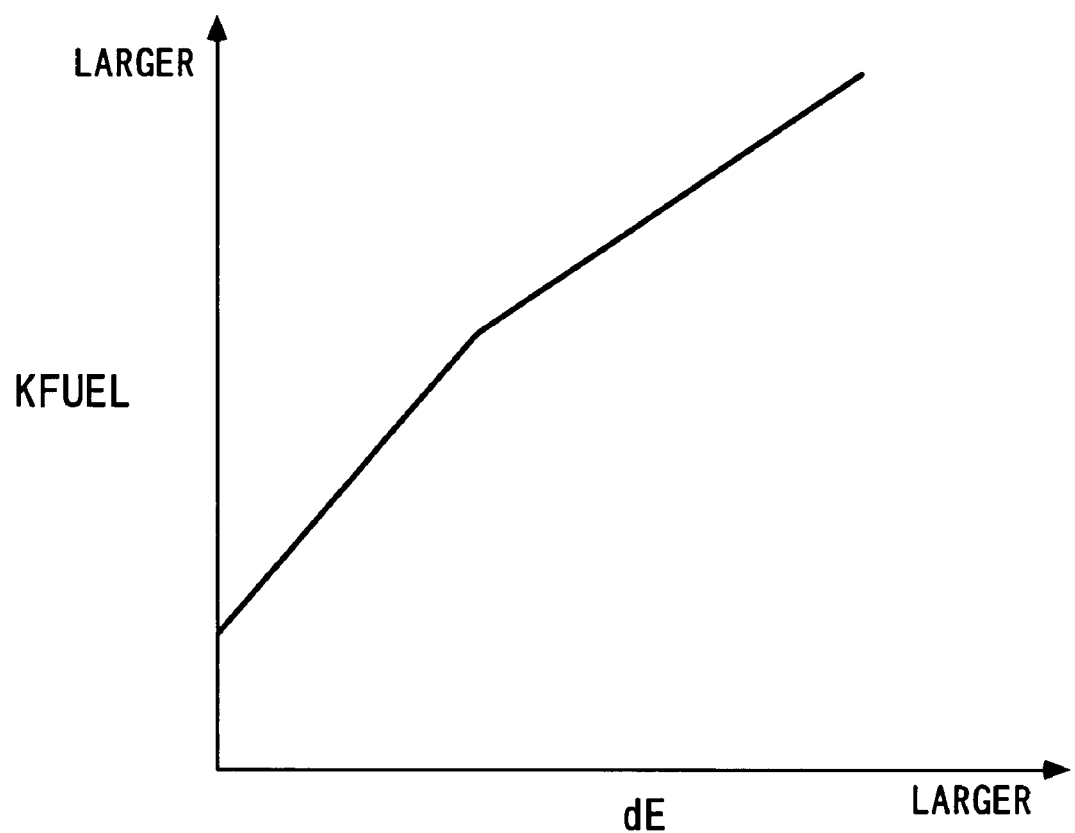
FIG. 13 is a diagram showing an example if a table used for calculating a correction coefficient KFUEL.

Next, the process goes to step 68, where a correction coefficient KFUEL is calculated by searching a table shown in FIG. 13 in accordance with the closing angle deviation dE. In this table, the correction coefficient KFUEL is set to a larger value as the closing angle deviation dE is larger. This is attributable to the following reason. Specifically, as the closing angle deviation dE is larger, the actual exhaust closing angle EXCLOSE_ACT presents a larger degree of alienation with respect to the target exhaust closing angle EXCLOSE_CMD, resulting in a larger lack of the internal EGR amount. Consequently, the in-cylinder gas temperature is shifted from an optimal value for the self ignition combustion on the lower side. Accordingly, the correction coefficient KFUEL is set in the aforementioned tendency for purposes of rapidly increasing such an in-cylinder gas temperature to the optimal value, to correct the fuel injection amount GFUEL2 for producing a stratified air-fuel mixture, which serves as a torch for burning a homogeneous air-fuel mixture with self ignition, on the increasing side to increase the amount of heat generated during the combustion of the stratified air-fuel mixture.

At step 69 subsequent to step 68, the fuel injection amount GFUEL2 for producing a stratified air-fuel mixture is set to the product (KFUEL·GFUEL2_MAP) of the correction value KFEUL and the basic value GFUEL2_MAP, followed by the termination of this process.

On the other hand, when the result of the determination at step 66 is YES, i.e., when a state of dE≧dEMax lasts for a time corresponding to the predetermined threshold value CTREF, it is determined that the internal EGR device, i.e., at least one of the exhaust lift varying mechanism 70 and the exhaust cam phase varying mechanism 90 has failed, and the process goes to step 70, where the failure determination flag F_FS is set to "1" to indicate to that effect.

Next, at step 71, the fuel injection amount GFUEL2 for producing a stratified air-fuel mixture is set to the value of zero, followed by the termination of this process. As described above, when the failure determination flag F_FS is set to "1" at step 70, the result of determination at step 60 is YES from then on, in which case step 71 is executed in the manner described above, followed by the termination of this process.

Turning back to FIG. 11, after calculating the fuel injection amount GFUEL2 for producing a stratified air-fuel mixture at step 43 in the foregoing manner, the process goes to step 44, where a fuel injection amount GFUEL1 for producing a homogeneous air-fuel mixture is set to a difference GFUEL-GFUEL2 by subtracting the fuel injection amount GFUEL2 for producing a stratified air-fuel mixture from the total fuel injection amount GFUEL.

Next, at step 45, a fuel injection timing calculation process is executed. Though specific contents are not shown, in this calculation process, a fuel injection timing in an intake stroke is calculated by searching a map, not shown, in accordance with the fuel injection amount GFUEL for producing a homogeneous air-fuel mixture and the engine rotational speed NE. Simultaneously with this, a fuel injection timing in a compression stroke is calculated by searching a map, not shown, in accordance with the fuel injection amount GFUEL2 for producing a stratified air-fuel mixture and the engine rotational speed NE. In this way, the fuel injection amounts GFUEL1, GFUEL2 for producing a homogeneous air-fuel mixture and for producing a stratified air-fuel mixture are injected from the fuel injection valve 10 into the combustion chamber 3e at the two fuel injection timings, respectively. As a result, within the combustion chamber 3e, the air-fuel mixture is such that the stratified air-fuel mixture concentrates near the ignition plug 11, and the stratified air-fuel mixture surrounds the stratified air-fuel mixture. In other words, an air-fuel mixture optimal for the torch self ignition combustion is produced.

After executing the fuel injection timing calculation process at step 45 in the foregoing manner, this process is terminated.

Turning back to FIG. 10, after executing the fuel injection control for the torch self ignition combustion mode at step 35 in the foregoing manner, this process is terminated.

On the other hand, when the result of the determination at step 34 is NO, indicating that the operation range of the engine 3 is in the fourth operation range in which the homogenous flame propagation combustion mode should be executed, the process goes to step 36, where the fuel injection control process for the homogeneous flame propagation combustion mode is executed. Though not shown, this control process is specifically executed as described below.

First, the fuel injection amount GFUEL1 for producing a homogeneous air-fuel mixture is calculated by searching a map, not shown, in accordance with the engine rotational speed NE and the required torque PMCMD. Next, a fuel injection timing for the homogeneous flame propagation combustion mode is calculated by searching a map, not shown, in accordance with the fuel injection amount GFUEL1 for producing a homogeneous air-fuel mixture and the engine rotational speed NE. This fuel injection timing for the homogeneous flame propagation combustion mode is calculated as a timing in an intake stroke. Subsequently, this processing is terminated. In the foregoing manner, the fuel in an amount equal to the calculated fuel injection amount GFUEL1 for producing a homogeneous air-fuel mixture is injected from the fuel injection valve 10 the combustion chamber 3e at the calculated fuel injection timing for the homogeneous flame propagation combustion mode. As a result, a homogeneous air-fuel mixture suitable for the homogeneous flame propagation combustion is produced within the combustion chamber 3e.

After executing the fuel injection control process for the homogeneous flame propagation combustion mode at step 36 in the foregoing manner, this process is terminated.

As described above, according to the control apparatus 1 of this embodiment, the three control inputs U_LIFT, U_SAAEX, U_CAEX to the exhaust gas recirculation mechanism 16, the exhaust lift varying mechanism 70, and the exhaust cam phase varying mechanism 90 are calculated, respectively, in accordance with the combustion mode value STS_BURNCMD in the EGR control process, such that the external EGR amount and the internal EGR amount are controlled by the control inputs, respectively. Further, in the fuel injection control process, the fuel injection amounts GFUEL1, GFUEL2 for producing a homogeneous air-fuel mixture and for producing a stratified air-fuel mixture are calculated, respectively, in accordance with the combustion mode value STS_BURNCMD. Particularly, when STS_BURNCMD=3, i.e., in the torch self ignition combustion mode, the correction coefficient KFUEL is calculated in accordance with the closing angle deviation dE, and the correction value GFUEL2_MAP is corrected by this correction coefficient KFUEL to calculate the fuel injection amount GFUEL2 for producing a stratified air-fuel mixture.

In this event, the closing angle deviation dE is calculated as a deviation of the actual exhaust closing angle EXCLOSE_ACT from the target exhaust closing angle EXCLOSE_CMD, the target exhaust closing angle EXCLOSE_CMD is calculated in accordance with the target internal EGR amount NEGRint, and the actual exhaust closing angle EXCLOSE_ACT is calculated in accordance with the exhaust cam phase CAEX and the pivotal angle SAAEX, so that the closing angle deviation dE is calculated as representing the relationship of magnitude between the target internal EGR amount NEGRint and the actual internal EGR amount. Accordingly, by using the correction coefficient KFUEL calculated in accordance with the closing angle deviation dE as mentioned above, in the torch self ignition combustion mode, the fuel injection amount GFUEL2 for producing a stratified air-fuel mixture can be calculated while a lacking degree or an exceeding degree of the actual internal EGR amount with respect to the target internal EGR amount NEGRint. In this way, even if the in-cylinder gas temperature falls out of a temperature range optimal for the combustion due to a lack or an excess of the internal EGR amount in the torch self ignition combustion mode, the fuel injection amount for producing a stratified air-fuel mixture is increased or decreased to increase or decrease the thermal energy during the combustion of the stratified air-fuel mixture which serves as a torch in the combustion cycle, thereby making it possible to rapidly ensure the in-cylinder gas temperature optimal for the self ignition combustion of the homogeneous air-fuel mixture, as compared with the conventional approach which controls the internal EGR amount or a recirculated gas amount.

Particularly, since the correction coefficient KFUEL is calculated to be a larger value as the closing angle deviation dE is larger, i.e., as the target internal EGR amount NEGRint exceeds the actual internal EGR amount to a larger degree, even if the in-cylinder gas temperature is lower than the optimal temperature for the combustion, which is particularly problematic when a homogeneous air-fuel mixture is burnt with self ignition, in the torch self ignition combustion mode, the fuel injection amount GFUEL2 for producing a stratified air-fuel mixture is increased to increase the thermal energy when the stratified air-fuel mixture, which serves as a torch, is burnt, thereby making it possible to rapidly and reliably achieve the optimal in-cylinder gas temperature for the self ignition combustion of the homogeneous air-fuel mixture in the combustion cycle. As a result, a stable combustion state can be ensured, and the fuel efficiency can be improved.

Also, when it is determined that at least one of the exhaust lift varying mechanism 70 and the exhaust cam phase varying mechanism 90 has failed, the fuel injection amount GFUEL2 for producing a stratified air-fuel mixture is set to the value of zero, so that the fuel injection amount GFUEL1 for producing a homogeneous air-fuel mixture alone is injected at a timing for producing a homogeneous air-fuel mixture even when the combustion mode value STS_BURNCMD is equal to three, indicating that the operation range of the engine 3 is in the third operation range in which the torch self ignition combustion mode. In this way, when at least one of the exhaust lift varying mechanism 70 and the exhaust cam phase varying mechanism 90 fails, the engine 3 is operated such that a homogeneous air-fuel mixture is burnt with a spark ignition even if the operation range of the engine 3 is in the third operation range in which the torch self ignition combustion mode should be executed, thus making it possible to restrain an unstable combustion state and a lower fuel efficiency resulting from a lack of the internal EGR amount and therefore ensure good drivability.

In addition, when the state of dE≧eDmax lasts for a time corresponding to the predetermined threshold value CTREF, i.e., the target internal EGR amount NEGRint exceeds the actual internal EGR amount by a predetermined degree or more for the time corresponding to the predetermined threshold value CTREF, it is determined that at least one of the exhaust lift varying mechanism 70 and the exhaust cam phase varying mechanism 90 has failed, so that even if dE≧dEmax is temporarily established due to noise or a detection error in spite of the fact that the exhaust lift varying mechanism 70 and the exhaust cam phase varying mechanism 90 are normal, it is possible to avoid erroneously determining that these mechanisms 70, 90 have failed, making it possible to improve the accuracy of the failure determination.

Further, the closing angle deviation dE is calculated in accordance with the pivotal angle SAAEX and the exhaust cam phase CAEX indicative of actual operating conditions of the exhaust lift varying mechanism 70 and the exhaust cam phase varying mechanism 90. In this event, since the pivotal angle SAAEX and the exhaust cam phase CAEX are utilized in the control of the internal EGR amount as well, the fuel injection control and the internal EGR control can be executed while sharing the pivotal angle sensor 26 for detecting the pivotal angle SAAEX and the crank angle sensor 20 and the exhaust cam angle sensor 27 for detecting the exhaust cam phase CAEX, making it possible to reduce the cost.

While the embodiment has shown an example which employs, as an index value, a deviation of the actual exhaust closing angle EXCLOSE_ACT which is an actual internal EGR amount parameter from the target exhaust closing angle EXCLOSE_CMD which is a target internal EGR amount parameter, i.e., the closing angle deviation dE, a deviation EXCLOSE_ACT-EXCLOSE_CMD of the actual exhaust closing angle EXCLOSE_ACT from the target exhaust closing angle EXCLOSE_CMD may be used as an index value.

Further, as an index value, a relative ratio between the target internal EGR amount parameter and the actual internal EGR amount parameter may be used. For example, as an index value, a ratio EXCLOSE_ACT/EXCLOSE_CMD, or a ratio EXCLOSE_CMD/EXCLOSE_ACT may be used.

Also, while the embodiment has shown an example in which the exhaust lift varying mechanism 70 and the exhaust cam phase varying mechanism 90 are used as the internal EGR device, the internal EGR device of the present invention is not so limited, but any mechanism may be available as long as it is capable of changing the amount of previously burnt gases which is left within the cylinder. For example, an intake lift varying mechanism and an intake cam phase varying mechanism which are configured in a similar manner to the exhaust lift varying mechanism 70 and the exhaust cam phase varying mechanism 90, respectively, and which are capable of changing a valve lift and a valve timing of the intake air valve 4, respectively, may be used.

On the other hand, while the embodiment has shown an example which uses the fuel injection valve 10 as the fuel injection device, the fuel injection device of the present invention is not so limited, but any device may be available as long as it is capable of producing both a stratified air-fuel mixture and a homogeneous air-fuel mixture in the torch self ignition combustion mode. For example, in addition to the fuel injection valve 10 of the embodiment, a fuel injection valve may be provided in an intake port, such that a homogeneous air-fuel mixture may be generated by the fuel injection valve in the intake port, and a stratified air-fuel mixture may be produced by the fuel injection valve 10.

Figure 12:
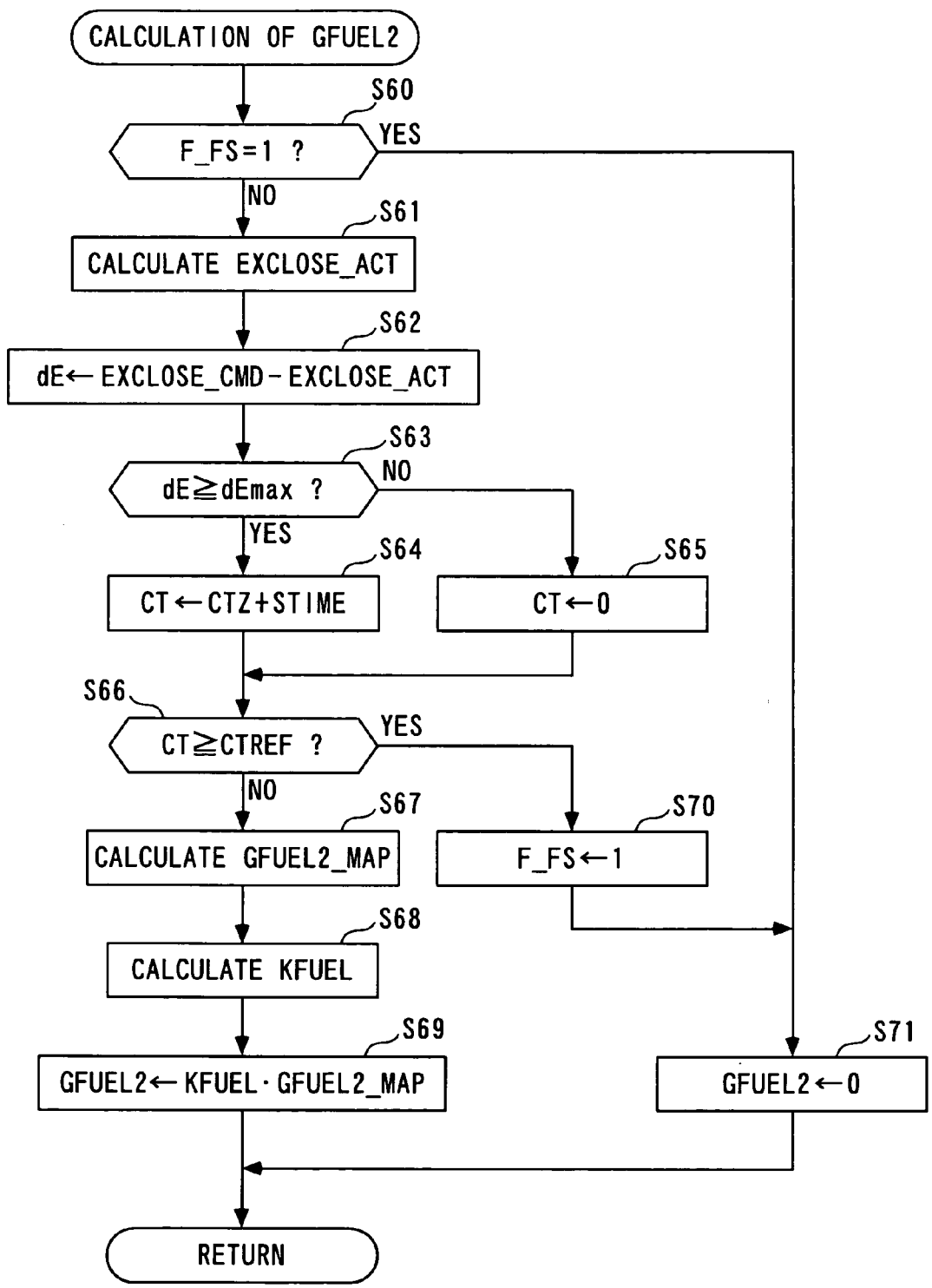
FIG. 12 is a flow chart showing a process for calculating a fuel injection amount GFUEL2 for a stratified air-fuel mixture generation.

Further, as an approach for calculating the fuel injection amount GFUEL2 for producing a stratified air-fuel mixture at step 43 in FIG. 11 described above, a calculation process shown in FIG. 14 may be used instead of the calculation process shown in FIG. 12 described above.

As is apparent with reference to FIG. 14, this calculation process is the same as the calculation process of FIG. 12 described above except for some part, so that different aspects will be centered in the following description with other aspects being omitted. In this calculation process, at step 81, a target in-cylinder gas temperature TempCYL_CMD (target internal EGR amount parameter) is calculated by searching a map, not shown, in accordance with the engine rotational speed NE and the required torque PMCMD.

Next, at step 82, an actual in-cylinder gas temperature TempCYL_ACT (actual internal EGR amount parameter) is calculated. This actual in-cylinder gas temperature TempCYL_ACT is an estimate of the unburnt gas temperature within the actual cylinder, and is specifically calculated in the following manner.

Specifically, the actual exhaust closing angle EXCLOSE_ACT is first calculated by searching a map, not shown, in accordance with the phase CAEX and the pivotal angel SAAEX, and an actual internal EGR amount NEGRint_ACT is calculated by a predetermined processing approach (for example, table search or the like) based on the actual exhaust closing angle EXCLOSE_ACT. Next, a basic value TempCYL_ACT_MAP for the actual in-cylinder gas temperature TempCYL_ACT is calculated by searching a map, not shown, in accordance with the engine rotational speed NE, the required torque PMCMD, and the actual internal EGR amount NEGRint_ACT. Subsequently, a correction coefficient Ktemp is calculated by searching a table, not shown, in accordance with the intake air temperature TA. Then, finally, the actual in-cylinder gas temperature TempCYL_ACT is calculated by the following equation (1):

$$TempCYL\_ACT = Ktemp \cdot TempCYL\_ACT\_MAP \quad (1)$$

At step 83 subsequent to step 82, a temperature deviation dT (index value) is set to a deviation TempCYL_CMD-TempCYL_ACT of the actual in-cylinder gas temperature TempCYL_ACT from the target in-cylinder gas temperature TempCYL_CMD.

Next, at step 84, it is determined whether or not the temperature deviation dT is equal to or larger than a predetermined upper limit value dTmax (predetermined degree). Then, steps 85-88 subsequent to this step 84 are executed in a similar manner to the aforementioned steps 64-67.

At step 89 subsequent to step 88, the correction coefficient KFUEL is calculated using a table (not shown) which defines the relationship between the correction coefficient KFUEL and the temperature deviation dT, instead of the aforementioned FIG. 13. In this table, for the reason set forth above, the fuel coefficient KFUEL is set to a larger value as the temperature deviation dT is larger. Then, steps 90-92 are executed in a similar manner to the aforementioned steps 69-71.

Figure 14:
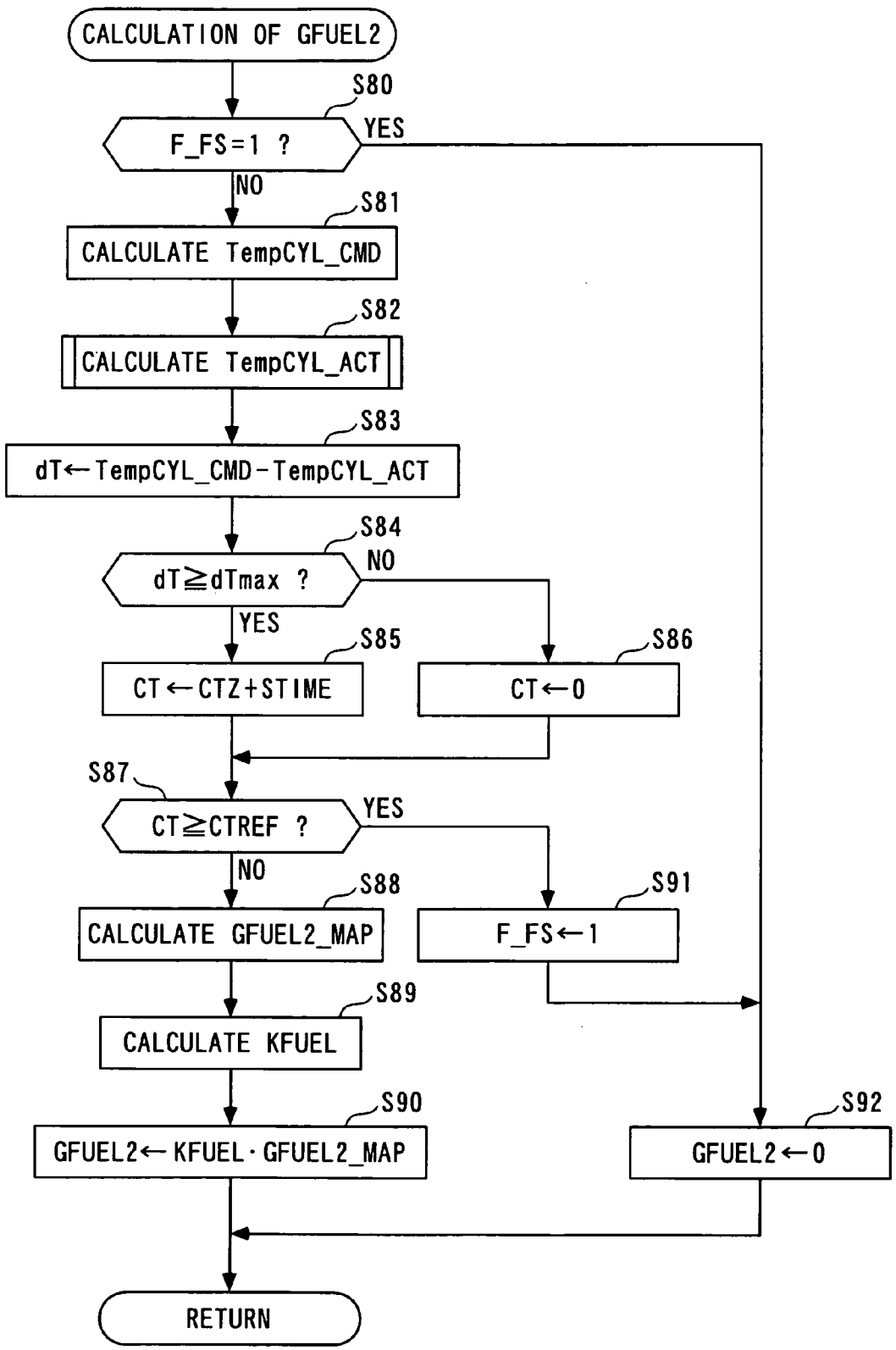
FIG. 14 is a flow chart showing an exemplary modification to the process for calculating a fuel injection amount GFUEL2 for a stratified air-fuel mixture generation.

With the calculation process of FIG. 14 described above, when the fuel injection amount GFUEL2 for producing a stratified air-fuel mixture is calculated, similar advantageous effects can be provided to those of the calculation process of FIG. 12 previously described. In addition, the temperature deviation dT is calculated as a deviation of the actual in-cylinder gas temperature TempCYL_ACT from the target in-cylinder gas temperature TempCYL_CMD. In this event, since the target in-cylinder gas temperature TempCYL_CMD and the actual in-cylinder gas temperature TempCYL_ACT can be utilized in the control of the internal EGR amount as well, the fuel injection control and the internal EGR control can be executed while sharing the target in-cylinder gas temperature TempCYL_CMD and the actual in-cylinder gas temperature TempCYL_ACT. In addition, since the actual in-cylinder gas temperature TempCYL_ACT is calculated in consideration of the influence of the intake air temperature TA, the in-cylinder gas temperature TempCYL_ACT can be calculated at a higher accuracy, thereby making it possible to further improve the accuracy at which the fuel injection amount GFUEL2 for producing a stratified air-fuel mixture is calculated.

What is claimed is:

1. A control apparatus for an internal combustion engine which is operated in a plurality of combustion modes including a torch self ignition combustion mode which involves changing a remaining amount of previously burnt gas generated within a cylinder as an internal EGR amount by an internal EGR device, forming an air-fuel mixture including both a stratified air-fuel mixture and a homogeneous air-fuel mixture by a fuel injection by a fuel injection device, burning the stratified air-fuel mixture with a spark ignition, and burning the homogeneous air-fuel mixture with self ignition using the burning stratified air-fuel mixture as a torch, said control apparatus comprising:

internal EGR control means for controlling the internal EGR amount by diving said internal EGR device;

actual internal EGR amount parameter calculating means for calculating an actual internal EGR amount parameter indicative of an actual internal EGR amount which is an estimate of the internal EGR amount, said actual internal EGR amount parameter calculated based on an actual exhaust closing angle of an exhaust valve in the internal combustion engine;

target internal EGR amount parameter calculating means for calculating a target internal EGR amount parameter which is a target for the actual internal EGR amount parameter;

index value calculating means for calculating one of a relative deviation and ratio between the calculated target internal EGR amount parameter and the calculated actual internal EGR amount parameter, as an index value;

fuel injection amount calculating means for calculating fuel injection amounts for producing a homogeneous air-fuel mixture and for producing a stratified air-fuel mixture, respectively, and calculating the fuel injection amount for producing a stratified air-fuel mixture in accordance with the calculated index value when in the torch self ignition combustion mode; and fuel injection control means for injecting a fuel of the calculated fuel injection amount for producing a homogeneous air-fuel mixture at a timing for producing a homogeneous air-fuel mixture, and injecting the fuel of the calculated fuel injection amount for producing a stratified air-fuel mixture at a timing for producing a stratified air-fuel mixture by driving said fuel injection device, wherein said fuel injection amount calculating means include correcting means for correcting, when the index value indicates that the target internal EGR amount parameter exceeds the actual internal EGR amount parameter in the torch self ignition combustion mode, the fuel injection amount for producing the stratified air-fuel mixture to be larger as the exceeding degree is larger.

2. A control apparatus for an internal combustion engine according to claim 1, further comprising:

failure determining means for determining that said internal EGR device has failed when the index value indicates that the target internal EGR amount parameter exceeds the actual internal EGR amount parameter to a predetermined degree or more, wherein said fuel injection amount calculating means sets the fuel injection amount for producing a stratified air-fuel mixture to the value of zero when said failure determining means determines that said internal EGR device has failed.

3. A control apparatus for an internal combustion engine according to claim 1, wherein said failure determining means determines that said internal EGR device has failed when the index value remains indicating, for a predetermined time or more, that the target internal EGR amount parameter exceeds the actual internal EGR amount parameter to a predetermined degree or more.

4. A control apparatus for an internal combustion engine according to claim 1, further comprising:

operating condition parameter detecting means for detecting an operating condition parameter indicative of an actual operating condition of said internal EGR device, wherein said actual internal EGR amount parameter calculating means calculates the actual internal EGR amount parameter in accordance with the detected operating condition parameter.

5. A control apparatus for an internal combustion engine according to claim 1, wherein said actual internal EGR amount parameter calculating means calculates the actual internal EGR amount parameter as an actual in-cylinder gas temperature which is an estimate of an unburnt gas temperature within the cylinder.

6. A control method for an internal combustion engine which is operated in a plurality of combustion modes including a torch self ignition combustion mode which involves changing a remaining amount of previously burnt gas generated within a cylinder as an internal EGR amount by an internal EGR device, forming an air-fuel mixture including both a stratified air-fuel mixture and a homogeneous air-fuel mixture by a fuel injection by a fuel injection device, burning the stratified air-fuel mixture with a spark ignition, and burning the homogeneous air-fuel mixture with self ignition using the burning stratified air-fuel mixture as a torch, said control method comprising the steps of:

controlling the internal EGR amount by driving said internal EGR device;

calculating an actual internal EGR amount parameter indicative of an actual internal EGR amount which is an estimate of the internal EGR amount, said actual internal EGR amount parameter calculated based on an actual exhaust closing angle of an exhaust valve in the internal combustion engine;

calculating a target internal EGR amount parameter which is a target for the actual internal EGR amount parameter;

calculating one of a relative deviation and ratio between the calculated target internal EGR amount parameter and the calculated actual internal EGR amount parameter, as an index value;

calculating fuel injection amounts for producing a homogeneous air-fuel mixture and for producing a stratified air-fuel mixture, respectively, and calculating the fuel injection amount for producing a stratified air-fuel mixture in accordance with the calculated index value when in the torch self ignition combustion mode; and injecting a fuel of the calculated fuel injection amount for producing a homogeneous air-fuel mixture at a timing for producing a homogeneous air-fuel mixture, and injecting the fuel of the calculated fuel injection amount for producing a stratified air-fuel mixture at a timing for producing a stratified air-fuel mixture by driving said fuel injection device, wherein said fuel injection amount calculating step includes the step of correcting, when the index value indicates that the target internal EGR amount parameter exceeds the actual internal EGR amount parameter in the torch self ignition combustion mode, the fuel injection amount for producing the stratified air-fuel mixture to be larger as the exceeding degree is larger.

7. A control method for an internal combustion engine according to claim 6, further comprising the step of:

determining that said internal EGR device has failed when the index value indicates that the target internal EGR amount parameter exceeds the actual internal EGR amount parameter to a predetermined degree or more, wherein said fuel injection amount calculating step includes setting the fuel injection amount for producing a stratified air-fuel mixture to the value of zero when said failure determining step determines that said internal EGR device has failed.

8. A control method for an internal combustion engine according to claim 6, wherein said failure determining step includes determining that said internal EGR device has failed when the index value remains indicating, for a predetermined time or more, that the target internal EGR amount parameter exceeds the actual internal EGR amount parameter to a predetermined degree or more.

9. A control method for an internal combustion engine according to claim 6, further comprising the step of:

detecting an operating condition parameter indicative of an actual operating condition of said internal EGR device, wherein said actual internal EGR amount parameter calculating step includes calculating the actual internal EGR amount parameter in accordance with the detected operating condition parameter.

10. A control method for an internal combustion engine according to claim 6, wherein said actual internal EGR amount parameter calculating step includes calculating the actual internal EGR amount parameter as an actual in-cylinder gas temperature which is an estimate of an unburnt gas temperature within the cylinder.

* * * * *